US011160000B2

(12) United States Patent
Kim et al.

(10) Patent No.: US 11,160,000 B2
(45) Date of Patent: Oct. 26, 2021

(54) DEVICE AND METHOD FOR LOAD BALANCING IN WIRELESS COMMUNICATION SYSTEM

(71) Applicant: Samsung Electronics Co., Ltd., Suwon-si (KR)

(72) Inventors: Eun Yong Kim, Yongin-si (KR); Namryul Jeon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 107 days.

(21) Appl. No.: 16/488,414

(22) PCT Filed: Feb. 23, 2018

(86) PCT No.: PCT/KR2018/002288
§ 371 (c)(1),
(2) Date: Aug. 23, 2019

(87) PCT Pub. No.: WO2018/155965
PCT Pub. Date: Aug. 30, 2018

(65) Prior Publication Data
US 2019/0380082 A1 Dec. 12, 2019

(30) Foreign Application Priority Data
Feb. 24, 2017 (KR) .................. 10-2017-0025097

(51) Int. Cl.
H04W 36/22 (2009.01)
H04W 28/08 (2009.01)
(Continued)

(52) U.S. Cl.
CPC .......... *H04W 36/22* (2013.01); *H04W 28/08* (2013.01); *H04W 36/0061* (2013.01); *H04W 36/30* (2013.01)

(58) Field of Classification Search
CPC .................................................... H04W 28/08
See application file for complete search history.

(56) References Cited

U.S. PATENT DOCUMENTS 7,295,811 B2 * 11/2007 Stern-Berkowitz ... H04W 36/18
343/757
9,008,707 B2 * 4/2015 Nilsson ............... H04W 52/243
455/501
(Continued)

FOREIGN PATENT DOCUMENTS

CN 102413238 A 4/2012
KR 10-2014-0034509 A 3/2014
(Continued)

OTHER PUBLICATIONS

European Search Report dated Nov. 6, 2019, issued in European Patent Application No. 18757725.9.
(Continued)

Primary Examiner — Jae Y Lee
Assistant Examiner — Andrew C Lee
(74) Attorney, Agent, or Firm — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A device for performing load balancing in a wireless communication system, according to various embodiments of the disclosure, comprises a communication unit and at least one processor operably coupled with the communication unit, wherein the at least one processor is configured so as to transmit a control signal for changing a serving cell of a first terminal from a first cell to a second cell on the basis of first measurement information of the first terminal serviced by the first cell and second measurement information of a second terminal serviced by the second cell, and each piece (Continued)

of information may include a beam and receiving strength for a serving cell and a neighboring cell.

20 Claims, 10 Drawing Sheets

(51) Int. Cl.
*H04W 36/00* (2009.01)
*H04W 36/30* (2009.01)

(56) References Cited

U.S. PATENT DOCUMENTS

| | | | | |
|---|---|---|---|---|
| 2006/0142021 | A1* | 6/2006 | Mueckenheim | H04W 36/22 455/453 |
| 2009/0323530 | A1 | 12/2009 | Trigui et al. | |
| 2010/0298006 | A1* | 11/2010 | Ko | H04B 7/022 455/452.2 |
| 2012/0134284 | A1* | 5/2012 | Dahlman | H04W 48/18 370/252 |
| 2012/0163185 | A1* | 6/2012 | Zhang | H04W 36/0069 370/241 |
| 2014/0050089 | A1 | 2/2014 | Zhang et al. | |
| 2014/0073329 | A1 | 3/2014 | Kang et al. | |
| 2015/0020157 | A1* | 1/2015 | Kim | H04W 36/18 726/3 |
| 2015/0031360 | A1 | 1/2015 | Choi et al. | |
| 2015/0208280 | A1* | 7/2015 | Lorca Hernando | H04W 28/08 370/235 |
| 2015/0265874 | A1* | 9/2015 | Rettig, Jr. | A63B 21/0088 600/538 |
| 2015/0341838 | A1* | 11/2015 | Pinheiro | H04W 88/06 455/449 |
| 2016/0006659 | A1 | 1/2016 | Kim et al. | |
| 2016/0066330 | A1* | 3/2016 | Centonza | H04W 72/0446 370/329 |
| 2016/0135069 | A1* | 5/2016 | Park | H04W 24/08 370/252 |
| 2016/0183143 | A1* | 6/2016 | Park | H04W 36/16 455/436 |
| 2016/0233947 | A1 | 8/2016 | Shen et al. | |
| 2016/0309376 | A1* | 10/2016 | Liu | H04L 5/0023 |
| 2016/0345338 | A1 | 11/2016 | Kim et al. | |
| 2016/0353339 | A1 | 12/2016 | Cui et al. | |
| 2017/0026293 | A1 | 1/2017 | Desclos et al. | |
| 2017/0215117 | A1* | 7/2017 | Kwon | H04B 7/0408 |
| 2017/0272219 | A1* | 9/2017 | Park | H04W 48/08 |

FOREIGN PATENT DOCUMENTS

| | | |
|---|---|---|
| KR | 10-2016-0004162 A | 1/2016 |
| KR | 10-2016-0041641 A | 4/2016 |
| WO | 2015/115784 A1 | 8/2015 |
| WO | 2016/124218 A1 | 8/2016 |

OTHER PUBLICATIONS

European Search Report dated Sep. 21, 2020; European Application No. 18 757 725.9-1212.
Chinese Office Action dated May 27, 2021, issued in Chinese Patent Application No. 201880025538.4.
European Office Action dated Jun. 28, 2021, issued in European Patent Application No. 18757725.9.
European Minutes dated Jun. 29, 2021, issued in European Patent Application No. 18757725.9.

* cited by examiner

DEVICE AND METHOD FOR LOAD BALANCING IN WIRELESS COMMUNICATION SYSTEM

BACKGROUND ART

The disclosure relates generally to wireless communication systems and, more particularly, to a device and a method for load balancing in wireless communication systems.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to overcome the problem of pathloss due to the characteristics of super-high frequency bands (e.g., mmWave), 5G communication systems are operated so as to increase signal gain using a beamforming technique. On the other hand, when the load of a specific cell is high, the quality experienced by users within coverage of the cell may be degraded. Therefore, in a beamforming-based wireless communication system, a load balancing technique for improving the quality experienced by a plurality of users is required.

DISCLOSURE OF INVENTION

Technical Problem

Based on the discussion as described above, the disclosure provides a device and a method for effectively distributing load in a wireless communication system.

In addition, the disclosure also provides a device and a method for distributing load in consideration of directivity of a beam in a wireless communication system.

In addition, the disclosure provides a device and a method for inducing handover in consideration of inter-cell interference due to directivity of a beam in a wireless communication system.

In addition, the disclosure provides a device and a method for adjusting power in consideration of a difference in geographical location in a wireless communication system.

According to various embodiments of the disclosure, a device for load balancing in a wireless communication system may include: a communication unit; and at least one processor operably connected to the communication unit, wherein the at least one processor is configured to, based on first measurement information of a first terminal served by a first cell and second measurement information of a second terminal served by a second cell, transmit a control signal for switching a serving cell of the first terminal from the first cell to the second cell, and wherein each piece of the first measurement information and the second measurement information includes information on a beam for a serving cell of the corresponding terminal and receiving strength thereof and information on a beam for a neighboring cell and receiving strength thereof.

According to various embodiments of the disclosure, a method of operating a device for load balancing in a wireless communication system may include, based on first measurement information of a first terminal served by a first cell and second measurement information of a second terminal served by a second cell, transmitting a control signal for switching a serving cell of the first terminal from the first cell to the second cell, wherein each piece of the first measurement information and the second measurement information includes information on a beam for a serving cell of the corresponding terminal and receiving strength thereof and information on a beam for a neighboring cell and receiving strength thereof.

A device and a method according to various embodiments of the disclosure can effectively distribute the load between cells by performing load balancing in consideration of directivity of a beam.

A device and a method according to various embodiments of the disclosure can control inter-cell interference by performing load balancing in consideration of an optimal beam and electric field information.

Effects which can be acquired by the disclosure are not limited to the above described effects, and other effects that have not been mentioned may be clearly understood by those skilled in the art from the following description.

BEST MODE FOR CARRYING OUT THE INVENTION

Figure 1:
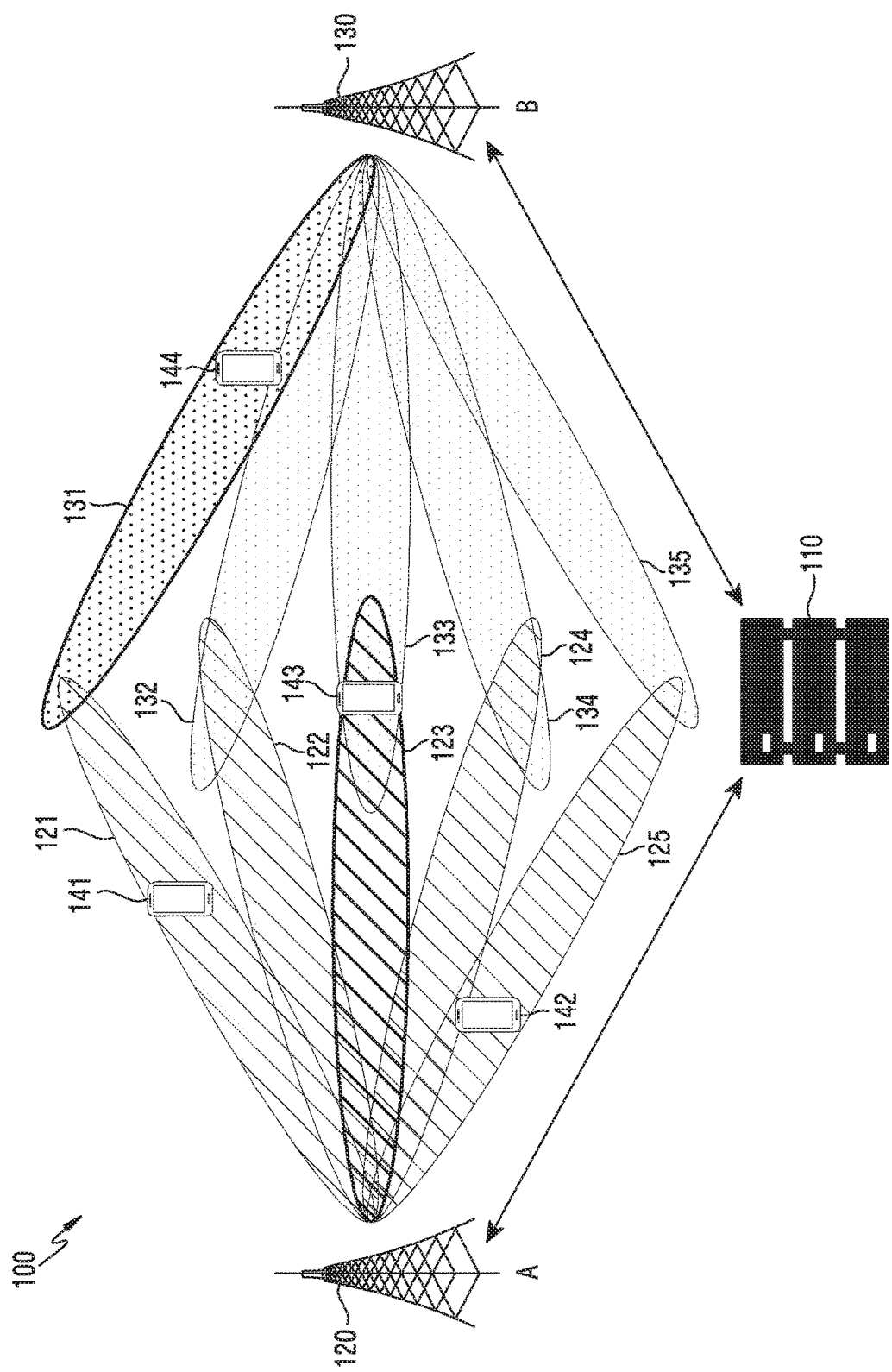
FIG. 1 illustrates a wireless communication environment according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

As used herein, the expression "A or B" or "at least one of A and/or B" may include all possible combinations of items enumerated together. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to", "adapted to", "made to", "capable of", or "designed to" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

Hereinafter, the disclosure relates to a device and a method for load balancing in a wireless communication system. Specifically, the disclosure describes operations for reducing the load concentrated on a specific cell by performing load balancing, based on beam information and receiving strength information of each cell, thereby providing optimal communication quality to users.

Terms referring to control information, terms referring to operation status (e.g., step, operation, and the like), terms referring to data (e.g., information, value, and like), terms referring to network entities (e.g., base station, 5GNB, central unit (CU), distributed unit (DU), radio unit (RU), and the like), terms referring to messages (e.g., feedback, signal, data, and the like), terms referring to components of a device, and the like, which are used herein, are provided as only examples for the convenience of description. Therefore, the disclosure is not limited to the terms described below, and other terms having equivalent technical meanings may be used.

In addition, the disclosure will provide various embodiments described using terms used in some communication standards (e.g., 3rd generation partnership project (3GPP)), but this is only an example for description. Various embodiments of the disclosure may be easily modified and applied to other communication systems. In addition, although the disclosure will be described based on downlink for the convenience of description, a device and a method according to various embodiments are applicable to uplink.

FIG. 1 illustrates a wireless communication environment 100 according to various embodiments of the disclosure. A term "cell" used herein may refer to a service coverage area of a base station. The base station may cover one cell, or may cover multiple cells. The multiple cells may be distinguished by a supported frequency and an area of a covering sector. In the following description, a base station may be used as a term including a cell, or a cell may be used as a term referring to a base station. A serving cell provides higher layer signaling (e.g., RRC (radio resource control) signaling) with a terminal, and may indicate one cell or a plurality of cells.

Referring to FIG. 1, the wireless communication environment 100 may include base stations, terminals, and a load balancing device 110. The base stations and the terminals in the wireless communication environment 100 may transmit and receive radio signals in a millimeter wave (mmWave) band (e.g., 28 GHz, 30 GHz, 38 GHz, or 60 GHz). In this case, in order to improve received signal power, the respective base stations and terminals may perform beamforming. The beamforming may include transmission beamforming and reception beamforming. That is, the respective base stations and terminals may assign directivity to transmission signals or reception signals. To this end, the base stations and the terminals may select a serving beam through a beam search or a beam management procedure. After the serving beam is selected, subsequent communication may be performed via resources that are in a quasi-co-located (QCL) relationship with a resource that transmitted the serving beam.

If the large-scale characteristics of the channel that carried symbols on the first antenna port can be inferred from the channel that carried symbols on the second antenna port, it can be determined that the first antenna port and the second antenna port are in a QCL relationship. For example, the large-scale characteristics may include at least one of delay spread, Doppler spread, Doppler shift, an average gain, an average delay, and spatial receiver parameters.

In some embodiments, the wireless communication environment 100 may be a mobile communication system, and the base station may provide a service to a mobile terminal entering a cell of the base station. In addition, in some embodiments, the wireless communication environment 100 may be a fixed wireless access system, and the base station according to various embodiments of the disclosure may provide a service to terminals within a limited area. In addition, the wireless communication environment may be a system in which mobile broadband (MBB) is further applied to the FWA.

The base stations may include a first base station 120 and a second base station 130. The terminals may include a first terminal 141, a second terminal 142, a third terminal 143, and a fourth terminal 144. The first base station 120 or the second base station 130 is network infrastructure that provides terminals with a wireless connection in the coverage thereof. The coverage may be defined as a geographical area predetermined based on a distance in which the first base station 120 or the second base station 130 is able to transmit signals. The first base station 120 may provide a service to terminals within a range of cell A. The second base station 130 may provide a service to terminals within a range of cell B. The first base station 120 may be referred to as, in addition to "base station", an "access point (AP)", an "eNodeB (eNB)", a "5$^{th}$ generation (5G) node", and a "5G NodeB (NB)", a "wireless point", a "transmission/reception point (TRP)", a "distributed unit (DU)", a "radio unit (RU)", a "remote radio head (RRH)", or another term having an equivalent technical meaning.

The first base station 120 may communicate with at least one terminal in coverage (e.g., the cell A) using beams 121 to 125. Specifically, the first base station 120 may communicate with the first terminal 141 using the beam 121 as a serving beam. The first base station 120 may communicate with the second terminal 142 using the beam 125 as a serving beam. The first base station 120 may communicate with the third terminal 143 using the beam 123 as a serving beam. The first base station 120 may be a serving base station of the first terminal 141, the second terminal 142, and the third terminal 143. The second base station 130 may communicate with at least one terminal in coverage using beams 131 to 135. Specifically, the second base station 130 may communicate with the fourth terminal 144 using the beam 131. Hereinafter, although it is described that the first base station 120 and the second base station 130 perform communication using five beams, respectively, this is only an example for the convenience of description, and the disclosure is not limited thereto. Alternatively, the first base station 120 may support eight beams.

The first terminal 141, the second terminal 142, the third terminal 143, and the fourth terminal 144 are devices used by users, and perform communication with the first base station 120 or the second base station 130 through wireless channels. In some cases, at least one of the first terminal 141, the second terminal 142, the third terminal 143, and the fourth terminal 144 may be operated without user's involvement. For example, the fourth terminal 144 may be a device for performing machine-type communication (MTC), and may not be carried by a user. Each of the first terminal 141, the second terminal 142, the third terminal 143, and the fourth terminal 144 may be referred to as, in addition to "terminal", "user equipment (UE)", a "mobile station", a "subscriber station", a "customer premises equipment (CPE) ", a "remote terminal", a "wireless terminal", an "electronic device", a "user device", or another term having an equivalent technical meaning. Terminals according to various embodiments of the disclosure (e.g., the first terminal 141, the second terminal 142, the third terminal 143, and the fourth terminal 144) may include at least one of, for example, smartphones, tablet PCs, mobile phones, video phones, and e-book readers, desktop PCs, laptop PCs, netbook computers, workstations, servers, PDAs, portable multimedia players (PMPs), MP3 players, medical devices, cameras, or wearable devices.

The load balancing device 110 may be intended to perform load balancing according to various embodiments of the disclosure. The load balancing device 110 may obtain first load information of the first base station 120. The first load information may include load information due to three terminals (the first terminal 141, the second terminal 142, and the third terminal 143) provided served by the cell A of the first base station 120. The load balancing device 110 may obtain second load information of the second base station 130. The second load information may include load information due to one terminal (the fourth terminal 144) served by the cell B of the second base station 130. The load balancing device 110 may determine that the load of the cell A is higher than the load of the cell B. The load balancing device 110 may determine to perform load balancing in order to improve the quality of service provided by the cell A.

The load balancing device 110 may determine a terminal to perform handover for load balancing. The load balancing device 110 may obtain measurement information measured by the terminal in the cell A and measurement information measured by the terminal in the cell B. The measurement information may include beam information indicating at least one beam in the corresponding cell and information about receiving strength of a signal transmitted through the at least one beam. The load balancing device 110 may determine a terminal to perform handover through measurement information about the respective cells of the plurality of terminals. The load balancing device 110 may transmit a signaling message instructing handover to a serving base station (e.g., the first base station 120) of the terminal (e.g., the third terminal 143) that is determined to perform handover. Upon receiving the message, the serving base station may transmit a handover command to the terminal determined to perform handover. The terminal may perform handover from the serving base station to a target base station (e.g., the second base station 130).

Although not shown in FIG. 1, the load balancing device 110 may also determine a terminal to control the power of a serving beam for load balancing. For example, it is assumed that two terminals served by the cell A are located in the service area of the first beam, and that one of the terminals is located in a service area in which the first beam of the cell A overlaps the second beam of the cell B. The load balancing device 110 may perform control such that the terminal located in the overlapping area to perform handover to the cell B. In this case, if the service areas of the first beam of the cell A and the second beam of the cell B overlap each other, the load balancing device 110 may determine that inter-cell interference has occurred. The load balancing device 110 may reduce the power of the first beam in order to control the interference. Accordingly, the load balancing device 110 may perform optimal load balancing in consideration of interface-cell interference.

In FIG. 1, as a separate deployment, the load balancing device 110 is illustrated as a separate device from the first base station 120 or the second base station 130. The load balancing device 110 may be a CU configured to perform a function of an upper layer (e.g., packet data convergence protocol (RCC)) in a radio access network (RAN), and the first base station 120 or the second base station 130 may be a DU configured to perform a function of a lower layer (e.g., medium access control (MAC), physical layer (PHY), and the like). On the other hand, unlike the configuration shown in FIG. 1, the load balancing device 110 may be included in the first base station 120 or the second base station 130 as an integrated deployment. In this case, the base station including the load balancing device 110 may receive load information, beam information, and receiving strength information from the other base station. In the following disclosure, for the convenience of description, the load balancing device 110 will be described as a device separated from the first base station 120 and the second base station 130, but the disclosure is not limited thereto.

In addition, although two different cells (or base stations) have been described as an example in FIG. 1, the disclosure is not limited thereto. A device and a method for load balancing according to various embodiments of the disclosure may be applied to three or more cells.

Figure 2:
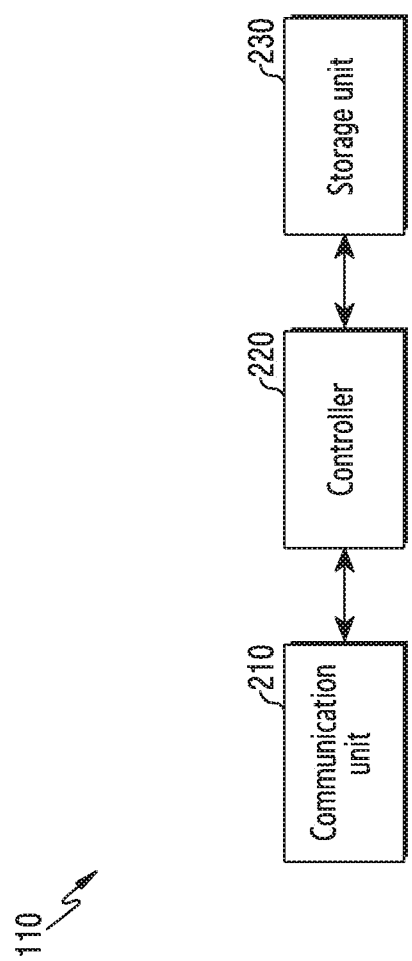
FIG. 2 illustrates the configuration of a load balancing device in a wireless communication system according to various embodiments of the disclosure.

FIG. 2 illustrates the configuration of a load balancing device in a wireless communication system according to various embodiments of the disclosure. The configuration illustrated in FIG. 2 may be understood as the configuration of the load balancing device 110 shown in FIG. 1. Hereinafter, the term "-unit", "-or (er)", or the like denotes a unit for processing at least one function or operation, and may be implemented as hardware, software, or a combination thereof.

Referring to FIG. 2, the load balancing device 110 may include a communication unit 210, a controller 220, and a storage unit 230.

The communication unit 210 may perform functions for transmitting and receiving information. Specifically, the communication unit 210 may provide an interface for communication with other nodes in the network. That is, the communication unit 210 converts a bit string transmitted from the load balancing device 110 to another node, for example, a base station (e.g., the first base station 120 or the second base station 130) or the like into a physical signal, and converts a physical signal received from the base station into a bit string.

The communication unit 210 may perform functions for transmitting and receiving signals in a wired communication environment. The communication unit 210 may include a wired interface for controlling a direct connection between a device and a device through a transmission medium (e.g., a copper wire or an optical fiber). For example, the communication unit 210 may transmit an electrical signal to another device through a copper wire, or may perform conversion between an electrical signal and an optical signal.

Meanwhile, the communication unit 210 may perform functions for transmitting and receiving signals in a wireless communication environment. For example, the communication unit 210 may perform a transformation between a baseband signal and a bit string according to the physical layer standard of a system. For example, in the case of data transmission, the communication unit 210 may generate complex symbols by encoding and modulating a transmission bit string. In the case of data reception, the communication unit 210 may restore a reception bit string by demodulating and decoding a baseband signal. In addition, the communication unit 210 may up-convert a baseband signal to a radio frequency (RF) band signal to thus transmit the same via an antenna, and may down-convert an RF band signal received via the antenna to a baseband signal. To this end, the communication unit 210 may include a transmitting filter, a receiving filter, an amplifier, a mixer, an oscillator, a digital-to-analog convertor (DAC), an analog-to-digital convertor (ADC), and the like. In addition, the communication unit 210 may include a plurality of transmission and reception paths. The communication unit 210 may be configured as a digital unit and an analog unit, and the analog unit may be configured as a plurality of sub-units according to operating power, an operating frequency, and the like.

According to various embodiments of the disclosure, the communication unit 210 may obtain load information from respective base stations. In some embodiments, if the load balancing device 110 performs a CU function, the communication unit 210 may obtain load information through a fronthaul connected to each of the base stations. In some other embodiments, if the load balancing device 110 is included in a base station, the communication unit 210 may obtain load information through a backhaul connected to each of other base stations.

According to various embodiments of the disclosure, the communication unit 210 may obtain measurement information of respective base stations. The measurement information may include first state information that is a result of measuring the state of a serving cell of the terminal and second state information that is a result of measuring the state of a neighboring cell of the terminal. The second state information may be referred to as a "measurement report (MR)". The result of measuring the state (e.g., the first state information and the second state information) may refer to beam information and information on receiving strength in a beamforming-based communication system.

According to various embodiments of the disclosure, the communication unit 210 may transmit a message so as to distribute the load under the control of the controller 220. For example, the communication unit 210 may transmit, to a specific base station, a control message to hand over a terminal. As another example, the communication unit 210 may transmit, to another base station, a control message to increase or decrease transmission power for a serving beam of a specific terminal.

The communication unit 210 transmits and receives signals as described above. Accordingly, the communication unit 210 may be referred to as a "transmitter", "receiver" or "transceiver". In addition, in the following description, transmission and reception will be used as a meaning to encompass the execution of the processes by the communication unit 210 as described above.

The controller 220 controls the overall operation of the load balancing device 110. For example, the controller 220 transmits and receives signals via the communication unit 210. In addition, the controller 220 writes or reads data to or from the storage unit 230. To this end, the controller 220 may include at least one processor.

According to various embodiments of the disclosure, the controller 220 may calculate the load of each base station in a predicted situation, based on load information and measurement information of respective cells. The controller 220 may include a computation unit that performs calculation. The computation unit is a set of commands or code stored in the storage unit 230, and may be commands/code at least temporarily residing in the controller 220 or a storage space for storing commands/code, or may be a part of a circuitry constituting the controller 220. The computation unit may perform an operation of calculating the maximum load or an operation of calculating an average load of all cells according to configuration. In addition, the controller 220 may control the load balancing device 110 so as to perform operations according to various embodiments of the disclosure, which will be described below.

According to various embodiments of the disclosure, the controller 220 may perform load balancing in consideration of load information of respective base stations (or cells). For example, the controller 220 may perform control such that a terminal belonging to a cell with a high load is handed over to another cell. As another example, the controller 220 may control the power of a serving beam of the base station for the terminal to be expected to have inter-cell interference.

The storage unit 230 may store data such as a basic program, application programs, and configuration information for the operation of the load balancing device 110. The storage unit 230 may be configured as a volatile memory, a non-volatile memory, or a combination of a volatile memory and a non-volatile memory. The storage unit 230 provides stored data at the request of the controller 220.

According to various embodiments of the disclosure, the storage unit 230 may store load information obtained from the respective base stations. For example, the storage unit 230 may store the load information by distinguishing from the base stations (or the cells).

According to various embodiments of the disclosure, the storage unit 230 may store measurement information obtained from the respective base stations. For example, the storage unit 230 may store the measurement information by distinguishing between the terminals. As another example, the storage unit 230 may store the measurement information by distinguishing between the beams.

Figure 3:
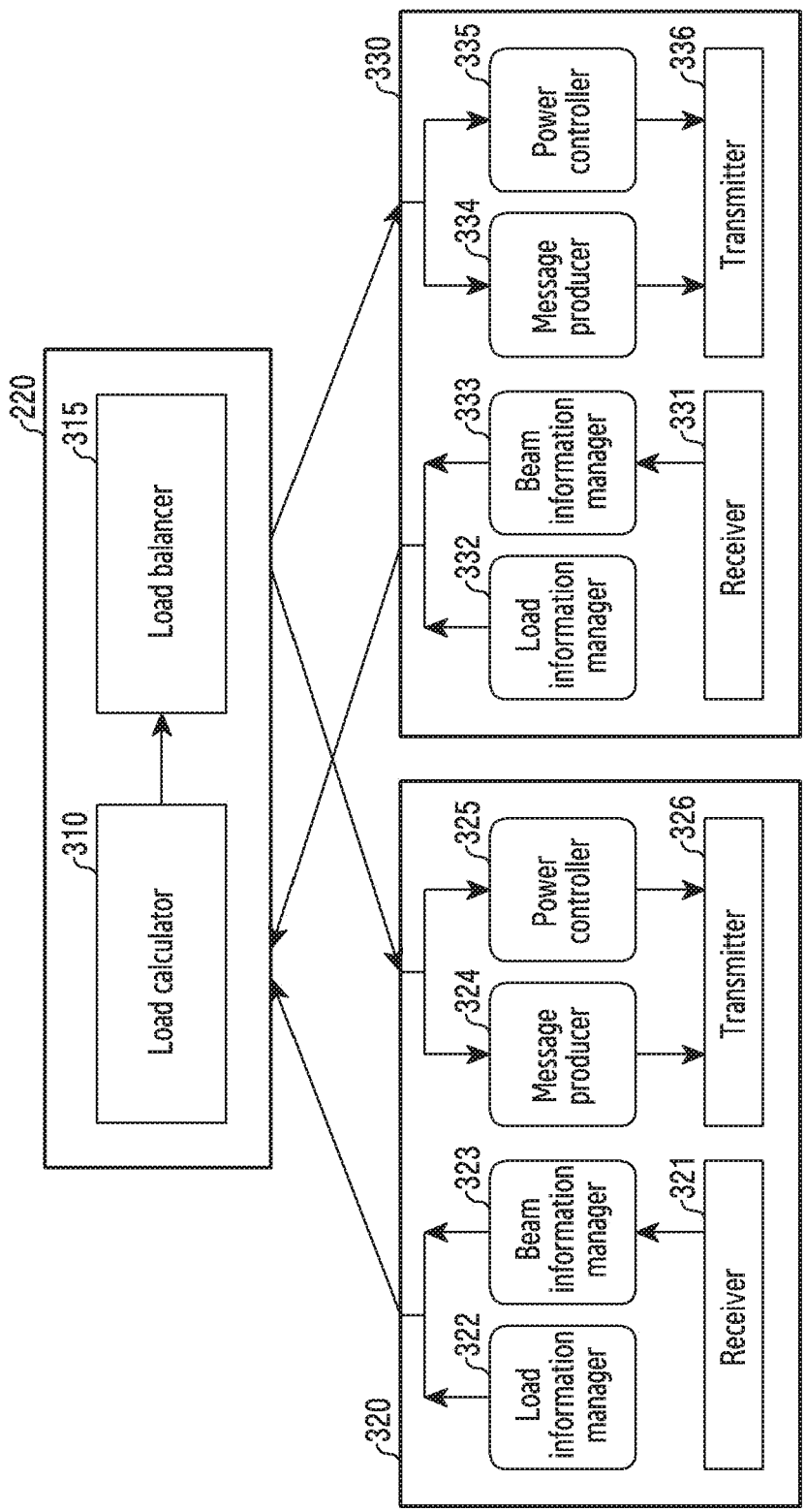
FIG. 3 illustrates a functional connection relationship for interworking of a load balancing device and base stations in a wireless communication system according to various embodiments of the disclosure.

FIG. 3 illustrates a functional connection relationship for interworking of a load balancing device 110 and base stations in a wireless communication system according to various embodiments of the disclosure.

Referring to FIG. 3, the controller 220 of the load balancing device 110 may include a load calculator 310 and a load balancer 315. In some embodiments, the controller 220 may communicate with the first base station 120 and the second base station 130 in FIG. 1 through the communication unit 210 in FIG. 2. The first base station 120 may include first base station configuration 320. The second base station 130 may include second base station configuration 330. In some other embodiments, unlike the embodiment shown in FIG. 3, the load balancing device 110 may be included in the first base station 120 or the second base station 130. That is, the controller 220 may be included in the first base station or the second base station 130. Although it is described that the configuration of the controller 220 of the load balancing device 110 is implemented in a device separate from the first base station 120 and the second base station 130 for the convenience of description as described above, the disclosure is not limited thereto. That is, according to another embodiment, at least one of the first base station 120 and the second base station 130 may include the configuration of the controller 220.

The first base station configuration 320 may include at least some of the first base station 120. The at least some configurations may refer to the configurations required for the operations of the controller 220 for load balancing according to various embodiments of the disclosure. The first base station configuration 320 may include a receiver 321, a load information manager 322, a beam information manager 323, a message producer 324, a power controller 325, and a transmitter 326.

The second base station configuration 330 may include at least some of the configurations of the second base station 130. The at least some configurations may refer to the configurations required for the operations of the controller 220 for load balancing according to various embodiments of the disclosure. The second base station configuration 330 may include a receiver 331, a load information manager 332, a beam information manager 333, a message producer 334, a power controller 335, and a transmitter 336.

The receiver 321 may receive measurement information. The measurement information may include first state information and second state information. As described above, the first state information refers to a term indicating a measurement result of a serving cell, and the second state information refers to a term indicating a measurement result of a neighboring cell. For the convenience of description, the first terminal 141 in FIG. 1 will be described as an example, but the following description may be applied to other terminals (e.g., the second terminal 142, the third terminal 143, and the fourth terminal 144).

The terminal 141 may measure a connection state with the first base station 120 (or the cell A) that is a serving base station (or a serving cell). The first base station 120 may transmit a reference signal in downlink through respective beams 121 to 125. The terminal 141 may measure received reference signals, thereby determining the channel quality of respective ones of the reference signals. Hereinafter, the channel quality in the disclosure may be at least one of, for example, beam reference signal received power (BRSRP), reference signal received power (RSRP), reference signal received quality (RSRQ), a received signal strength indicator (RSRI), a signal-to-interference and noise ratio (SINR), a carrier-to-interference and noise ratio (CINR), a signal-to-noise ratio (SNR), an error vector magnitude (EVM), a bit error rate (BER), and a block error rate (BLER). In addition to the above examples, other terms having equivalent technical meanings or other metrics indicating channel quality may be used. Hereinafter, high channel quality in the disclosure means that a channel quality value related to the magnitude of a signal is large or a channel quality value related to an error rate is small. Higher channel quality may mean that an effective wireless communication environment is guaranteed. In addition, an optimal beam may be a beam having the highest channel quality, among the beams.

The terminal 141 may send, to the first base station 120, as feedback, information about a beam of high quality and information on the receiving strength of a reference signal transmitted through the beam, based on the measurement result. Hereinafter, the information about the beam (e.g., an index of the beam, a resource identifier (ID) assigned to the beam, and the like) and the information on the receiving strength, which are measured for the serving cell, may be referred to as first state information. The first state information may include information on one or more (e.g., two or four) beams of high quality and information on the receiving strength thereof according to configuration. For example, if the configuration is made in such a way that feedback of one beam is required, the terminal 141 may transmit, to the first base station 120, an index of the beam having the largest receiving strength and receiving strength information of the corresponding index. In the following description, the beam with the largest receiving strength may be referred to as a "best beam" or a "preferred beam".

The terminal 141 may measure the state of the second base station 130 (or the cell B), which is a neighboring base station (or a neighboring cell), in addition to the serving base station. The terminal 141 may measure the quality of a signal transmitted from the second base station 130. The terminal 141 may report, to the first base station 120, information about a beam of high quality and information on the receiving strength of a signal transmitted through the beam, based on the measurement result. Hereinafter, the information about the beam and the information on the receiving strength, which are measured for the neighboring cell, may be referred to as "second state information".

Although the above description has been made of the first terminal 141 as an example, the receiver 321 may receive measurement information of each of the second terminal 142 and the third terminal 143 served by the first base station 120. The receiver 321 transmits all of the received measurement information to the beam information manager 323.

The beam information manager 323 may obtain first state information of a serving cell from the measurement information received from the receiver 321. The beam information manager 323 may identify and manage the beams having relatively large receiving strength and the receiving strength thereof for the serving base station. The beam information manager 323 may obtain second state information of a neighboring cell from the measurement information received from the receiver 321. The beam information manager 323 may identify and manage a beam having the largest receiving strength and the receiving strength thereof for each of one or more neighboring base stations.

The load information manager 322 may measure the load of the cell A of the first base station 120. The load information manager 322 may measure and manage the load of the cell A in any of various ways depending on the definition of the load. In some embodiments, the load information manager 322 may measure and manage, as a cell load, an average amount of usage of physical resource blocks (PRBs) in the cell A. In some other embodiments, the load information manager 322 may measure and manage, as a cell load, a PRB ratio required for throughput in the guaranteed bit rate (GBR) of the cell A (hereinafter, referred to as "GBR throughput"). In some other embodiments, the load information manager 322 may measure and manage, as a cell load, the number of terminals connected to the cell A. In some other embodiments, the load information manager 322 may measure and manage, as a cell load, average transmission power values used in the cell A.

The load information manager 322 and the beam information manager 323 may transmit the measured and managed information to the load calculator 310 of the controller 220, respectively. The measured and managed information means load information and measurement information of the corresponding cell. In some embodiments, the load information manager 322 and the beam information manager 323 may be configured to transmit the managed information to the controller 220 at a predetermined interval. Although the description has been made of the first base station configuration 320, the second base station configuration 330 may transmit the information measured and managed by the load information manager 332 and the beam information manager 333 to the load calculator 310 in the same or a similar manner as the first base station configuration 320.

The load calculator 310 may obtain load information and measurement information of each of all cells managed by the load balancing device 110. The load calculator 310 may configure a plurality of configuration combinations, based on the obtained load information and measurement information of each of all the cells. In addition, the load calculator 310 may calculate an expected load of each of the plurality of configuration combinations. The configuration combination is a combination of serving cells selected by the terminals, and means a result in which at least some of the serving cells of the terminals are rearranged according to load balancing. In other words, the plurality of configuration combinations means the cases distinguished according to the serving cell configured by the terminal. That is, the configuration combination represents one of the states in which the serving cells of the terminals are determined, and one configuration combination indicates one of a plurality of possible cases.

The load calculator 310 may calculate a load for each cell in an environment predicted according to respective configuration combinations. The load calculator 310 may calculate the loads of respective ones of the plurality of cells in one of the plurality of configuration combinations, and may then change the configuration combinations, thereby calculating the loads of the respective cells. In other words, the load calculator 310 may calculate the load for each cell through a repeated operation for each of the plurality of configuration combinations. For example, if the number of cells is W and the number of configuration combinations is Z, the load calculator 310 may produce (W×Z) load calculation results. In this case, the load to be calculated may be variously defined according to detailed embodiments. The load calculator 310 may transmit load calculation results for the respective configuration combinations to the load balancer 315.

The load balancer 315 may select one of the plurality of configuration combinations, based on a plurality of load calculation results by the load calculator 310. In addition, the load balancer 315 may control signaling necessary to perform load balancing. In this case, the criteria for selecting one configuration combination may be variously defined according to detailed embodiments.

The load balancer 315 may perform load balancing according to the selected combination. In some embodiments, the load balancer 315 may determine at least one terminal to perform handover, based on the plurality of load calculation results. For example, in FIG. 1, the load balancer 315 may determine to perform handover of the third terminal 143. In some other embodiments, the load balancer 315 may determine a terminal to control power, based on the plurality of load calculation results. For example, the load balancer 315 may identify a terminal close to a serving cell and another terminal far away from the serving cell in the service area of one beam. The load balancer 315 may determine to hand over the terminal far from the serving cell to another cell. In this case, in order to minimize interference between the terminal far away from the serving cell and the terminal close to the serving cell, the load balancer 315 may reduce the transmission power of the serving beam of the terminal close to the serving cell.

The load balancer 315 may transmit a control message to at least one of the first base station 120 or the second base station 130. In some embodiments, the control message may be a message for instructing the terminal, which is being served, to perform handover. The load balancer 315 may transmit the control message to the message producer 324 of the first base station 120 or to the message producer 334 of the second base station 130. In some other embodiments, the control message may be a message instructing to control the power of the serving beam of the terminal, which is being served. The load balancer 315 may transmit the control message to the power controller 325 of the first base station 120 or to the power controller 335 of the second base station 130.

If the control message is received from the load balancer 315, the message producer 324 may produce a handover command to instruct the terminal, which is determined to perform handover, to perform handover. Specifically, the message producer 324 may produce an RRC connection reconfiguration message including mobility control information (MCI). The MCI may be included in the RRC connection reconfiguration message through a "Mobility- ControlInfo information element (IE)". The transmitter 326 may transmit the RRC connection reconfiguration message to the terminal determined to perform handover. The message producer 334 and the transmitter 336 of the second base station 130 operate in the same or a similar manner as the message producer 324 and the transmitter 326, respectively.

If the control message is received from the load balancer 315, the power controller 325 may control parameters in the transmitter 326 so as to control power as indicated by the control message. For example, the power controller 325 may control a parameter in the transmitter 326 so as to lower the power of a specific beam according to beam information (e.g., a beam index) indicated by the control message. As another example, the power controller 325 may control a parameter in the transmitter 326 so as to increase the power of a specific beam according to the power value indicated by the control message. The power controller 335 of the second base station 130 operates in the same or a similar manner as the power controller 325.

In FIGS. 1 to 3, a wireless communication environment for load balancing, necessary information (e.g., load information, measurement information, and the like), a result of load balancing, and operations for determining load balancing according to various embodiments of the disclosure have been described. Hereinafter, the flow of overall operation for calculating a load for each cell and performing load balancing will be described with reference to FIGS. 4 and 5, and detailed operations for calculating a load for each cell in respective predicted situations for effective load balancing will be described with reference to FIGS. 6 and 7.

Figure 4:
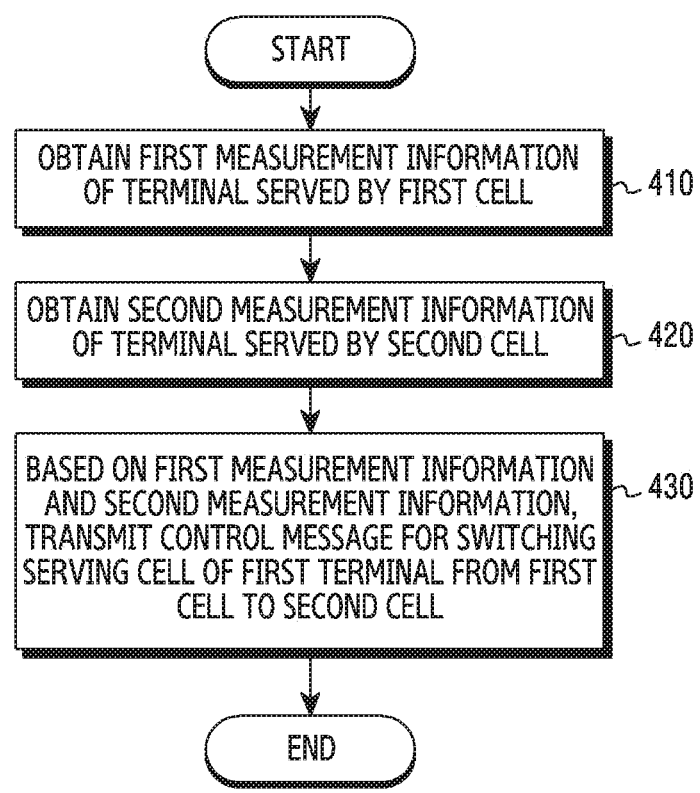
FIG. 4 is a flowchart illustrating the operation of a load balancing device in a wireless communication system according to various embodiments of the disclosure.

FIG. 4 is a flowchart illustrating the operation of the load balancing device 110 in a wireless communication system according to various embodiments of the disclosure. For the convenience of description, the flow of operation in which the load balancing device 110 balances the load of the first cell (e.g., the cell A) of the first base station 120 and the second cell (e.g., the cell B) of the second base station 130 will be described.

Referring to FIG. 4, in step 410, the load balancing device 110 may obtain first measurement information of a terminal served by the first cell. For example, the terminal may be the third terminal 143 shown in FIG. 1. The first measurement information may include first state information of a serving cell of the third terminal 143. The first state information may include at least one piece of beam information indicating an optimal beam (e.g., the beam 123) for the serving cell of the third terminal 143 and information indicating the receiving strength of a reference signal transmitted through the optimal beam for the serving cell. In addition, the first measurement information may include second state information of a neighboring cell of the third terminal 143. The second state information, as a measurement report, may include at least one piece of beam information indicating an optimal beam for each of one or more neighboring cells of the third terminal 143 and information on the receiving strength of a signal transmitted through the optimal beam for each of the one or more neighboring cells. For example, the beam information may be a beam index indicating an optimal beam or a beam resource ID indicating a resource allocated to the optimal beam. For example, the receiving strength may be at least one of RSRP, RSSI, or RSRQ.

In operation 420, the load balancing device 110 may obtain second measurement information of a terminal served by the second cell. For example, the terminal may be the fourth terminal 144 shown in FIG. 1. The second measurement information may be first state information on a serving cell of the fourth terminal 144 and second state information on each of one or more neighboring cells of the fourth terminal 144. The second measurement information may be determined in the same or a similar manner as the first measurement information.

In step 430, the load balancing device 110 may transmit a control message (control signal) for switching the serving cell of the first terminal from the first cell to the second cell, based on the first measurement information and the second measurement information. To this end, the load balancing device 110 may configure a plurality of configuration combinations, and may determine one specific configuration combination as a result of load balancing. Specifically, the load balancing device 110 may identify a specific configuration combination that satisfies specific criteria. The criteria for identifying a specific configuration combination may be defined as preferring the fairness of the load, preferring the overall system load (e.g. multiple cells), preferring the reduction in the load (e.g. a specific cell), preferring interference between the cells due to the beams, or preferring prevention of the occurrence of a maximum/minimum threshold value. The load balancing device 110 may perform control so as to hand over a specific terminal from a serving cell to a target cell as indicated by the determined specific configuration combination. The load balancing device 110 may transmit a control message to the serving cell of the specific terminal. The base station supporting the serving cell of the specific terminal may transmit a handover command to the specific terminal through higher layer signaling.

As described with reference to FIG. 4, the load balancing device 110 may control load balancing, based on measurement information related to beams. Accordingly, load balancing in consideration of the directivity of the beam can be performed.

Although not shown in FIG. 4, in some embodiments, the load balancing device 110 may perform the operations described in FIG. 4 in response to detecting that the first cell is overloaded. The load balancing device 110 may perform the operations described in FIG. 4 in order to hand over any terminal served by the first cell to another cell. In some other embodiments, the load balancing device 110 may perform the operations described in FIG. 4 periodically, regardless of the detection result of the current load state of the first cell.

Figure 5:
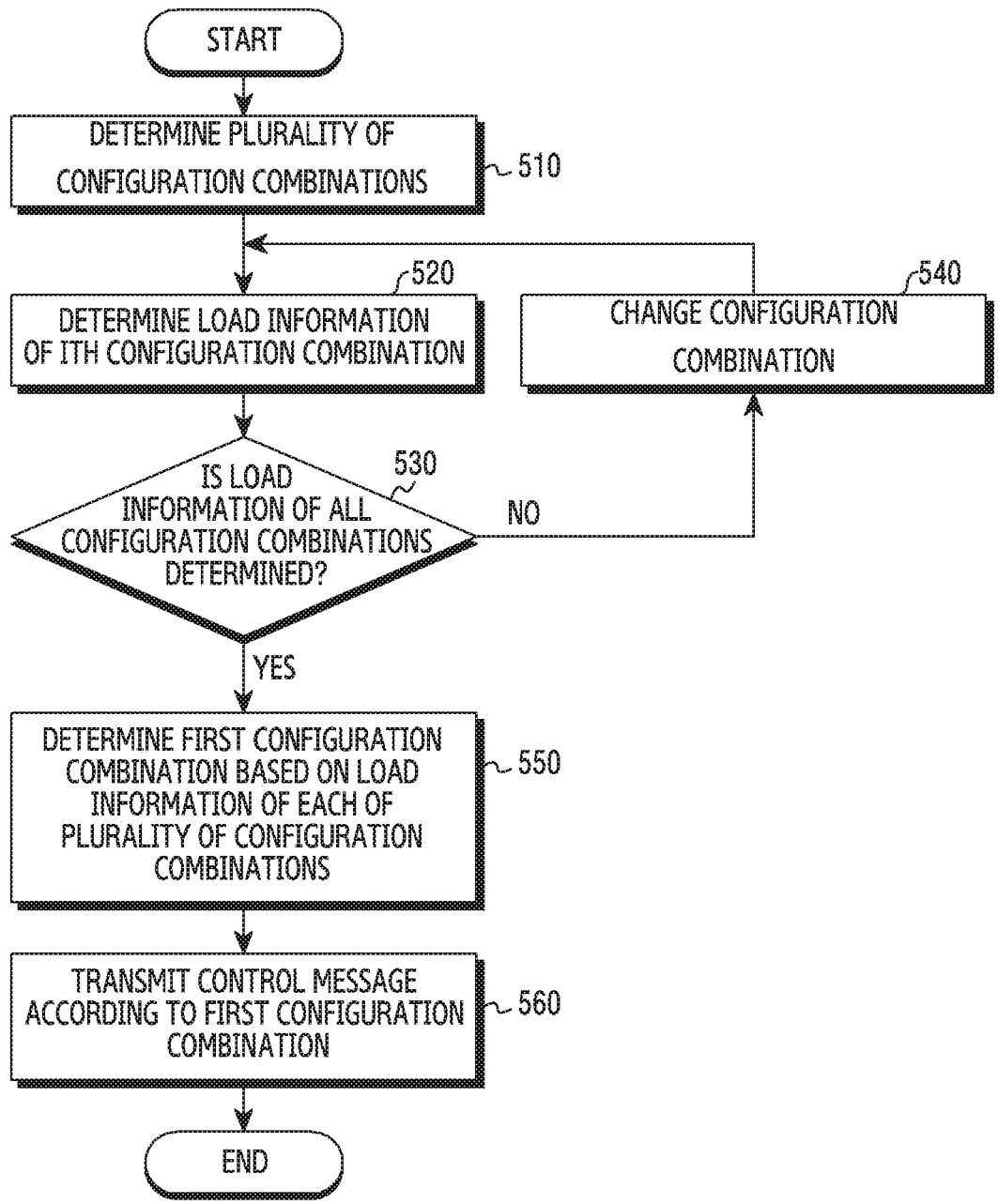
FIG. 5 is a flowchart illustrating an operation of calculating a load by a load balancing device in a wireless communication system according to various embodiments of the disclosure.

FIG. 5 is a flowchart illustrating an operation of calculating a load by a load balancing device 110 in a wireless communication system according to various embodiments of the disclosure. The load balancing device 110 may perform load calculation in order to determine a terminal to perform handover in step 430 in FIG. 4.

Referring to FIG. 5, in step 510, the load balancing device 110 may determine a plurality of configuration combinations. The configuration combination refers to a combination of configurable serving cells of the respective terminals. In some embodiments, the load balancing device 110 may configure a plurality of configuration combinations, based on the number of cells and the number of terminals served by the cells. For example, if the number of cells managed by the load balancing device 110 is N, and if the number of terminals is M, the load balancing device 110 may configure $N^M$ configuration combinations. This is due to the fact that the number of serving cells available for one terminal is N. For example, if the load balancing device 110 manages the cell A and the cell B, and if the terminal x and the terminal y are located in the cell A and the cell B, the terminal x and the terminal y may correspond to one of the configuration combinations (A, A), (A, B), (B, B), and (B, A).

In some other embodiments, the load balancing device 110 may configure a plurality of configuration combinations, based on load information and beam information of the respective cells. The load balancing device 110 may identify a terminal of which the beam index reported as an optimal beam for one serving cell is different from those of other terminals. The load balancing device 110 may recognize that other terminals are not located in the area covered by the serving beam of the identified terminal. The load balancing device 110 may configure the plurality of configuration combinations in consideration of the case where the identified terminal is handed over to another cell other than the current serving cell. If the current serving cell of the identified terminal does not serve the identified terminal, there may not be interference due to the corresponding serving beam. The load balancing device 110 may determine handover of the identified terminal as a sufficient condition of the plurality of configuration combinations. For example, if the number of cells managed by the load balancing device 110 is X, and if the number of terminals served by the X cells is Y, the load balancing device 110 may configure $(X-1) \times X^{Y-1}$ configuration combinations.

In operation 520, the load balancing device 110 may determine load information of the $i^{th}$ configuration combination from among the plurality of configuration combinations. The load information represents a load for each cell. In other words, the load balancing device 110 may calculate a load for each cell of the $i^{th}$ configuration combination. For example, the load balancing device 110 may calculate a load for each cell of the second configuration combination. The load balancing device 110 may calculate the load of the cell A and the load of the cell B in the case where the serving cell of the terminal x is the cell A and the serving cell of the terminal y is the cell B.

The load may be defined in any of various ways. In some embodiments, the load may be defined as the number of terminals (users) connected to the cell. For example, if the number of terminals connected to the cell A is three, and if the number of terminals connected to the cell B is one, the load balancing device 110 may determine the load of the cell A to be "3" and the load of the cell B to be "1".

In some other embodiments, the load may be defined as the amount of load that the cell processes on average. For example, if the average throughput per cycle of cell A is 100 PRBs, and if the average throughput per cycle of cell B is 60 PRBs, the load balancing device 110 may determine the load of the cell A to be "100" and the load of the cell B to be "60".

In some other embodiments, the load may be defined as a GBR throughput of each of the terminals connected to the cell. The load balancing device 110 may determine a load for each cell according to each of the plurality of configuration combinations, based on the GBR throughput of each terminal. For example, the load balancing device 110 may summate the GBR throughputs of the respective terminals connected to each cell (e.g., an RRC connection), thereby determining a load for each cell.

In some other embodiments, the load may be defined according to a quality parameter of the terminals connected to the cell. For example, the load balancing device 110 may determine a load for each cell according to each of the plurality of configuration combinations, based on the average spectrum efficiency or a modulation and coding scheme (MCS) of each terminal.

In some other embodiments, the load may be defined according to the transmission power. The load balancing device 110 may determine a load for each cell according to each of the plurality of configuration combinations, based on the average transmission power of a data channel for each beam of each cell. For example, the load balancing device 110 may determine a load for each cell according to beams used to provide services to the terminals in the cell and an average amount of power required for the use of the beams.

The load balancing device 110 may perform a calculation to predict a change in the load of each cell if a specific terminal is handed over from the current serving cell to another cell. For example, cell A serving three terminals and cell B serving one terminal are assumed. The cell A may have an average throughput of 100 PRBs per cycle, and the cell B may have an average throughput of 30 PRBs per cycle. If the load balancing device 110 is in service in the cell A, and if a terminal having a required throughput of 30 PRBs per cycle is to be handed over to the cell B, the load balancing device 110 may determine that it is predicted that the load of the cell A is "70 PRBs" and the load of the cell B is "60 PRBs".

In operation 530, the load balancing device 110 may determine whether or not load information has been determined with respect to all the configuration combinations. If there is a configuration combination of which the load information has not been determined, the load balancing device 110 may perform an operation corresponding to step 540. If load information of all configuration combinations has been determined, the load balancing device 110 may perform the operation corresponding to step 550.

In step 540, the load balancing device 110 may replace the current configuration combination by a subsequent configuration combination. For example, the load balancing device 110 may calculate a load for each cell with respect to the third configuration combination. The load balancing device 110 may change related parameters so as to calculate a predicted load, assuming that the serving cell of the terminal x and the serving cell of the terminal y are configured as the cell B. Thereafter, the load balancing device 110 may repeatedly perform operations 520 and 530.

In step 550, the load balancing device 110 may determine a first configuration combination, based on the load information of the respective configuration combinations. The first configuration combination may be referred to as a "best (or optimal) configuration combination". The load balancing device 110 may identify a first configuration combination that satisfies specific criteria from the calculated load for each cell with respect to the respective configuration combinations. The specific criteria may be predetermined or adaptively changed according to the user of the load balancing device 110, the operator of the wireless communication environment 100, or a policy. The specific criteria may prefer the fairness of the load, may prefer the overall system load (e.g. multiple cells), may prefer the reduction in the load (e.g. a specific cell), or may prefer prevention of the occurrence of a maximum/minimum threshold value. As a specific example, the load balancing device 110 may identify a first configuration combination having the lowest load on the entire cell operated by the load balancing device 110 from among the plurality of configuration combinations. As another example, the load balancing device 110 may identify a first configuration combination in which the cell having the largest load, among the cells, has a largest reduction in the load from among the plurality of configuration combinations. As another example, the load balancing device 110 may identify a first configuration combination that minimizes an average load of the cells according to each of the plurality of configuration combinations. As another example, the load balancing device 110 may identify a first configuration combination that minimizes standard deviation of the loads of the cells.

Meanwhile, if a specific terminal is handed over from the current serving cell to a target cell (another cell), the load balancing device 110 may consider a change in the interference component of another terminal, as well as a change in the channel of the specific terminal. For example, in the case where two terminals served by the cell A have the same optimal serving beam, if only one terminal is controlled to be handed over to the cell B, the other terminal located in the same serving beam area may experience interference due to the beam of the cell B. Accordingly, in some embodiments, the load balancing device 110 may further manage priority for each of the plurality of configuration combinations in consideration of the interference component, thereby determining the first configuration combination. For example, the load balancing device 110 may lower the priority of a configuration combination for handing over only one of the terminals located in the same serving beam area, or may increase the priority of a configuration combination in which other terminals are not located in the corresponding beam area, thereby determining the first configuration combination.

In step 560, the load balancing device 110 may transmit a control message according to the determined first configuration combination. It is possible to determine whether or not to perform load balancing by comparing the difference between the determined first configuration combination and the configuration combination preconfigured in the current load balancing device 110. If there is a difference, or if the difference is equal to or greater than a threshold value, the load balancing device 110 may transmit a control message. For example, the preconfigured configuration combination may be a combination in which the serving cell of the terminal x is the cell A and the serving cell of the terminal y is the cell A. The first configuration combination may be a combination in which the serving cell of the terminal x is the cell B and the serving cell of the terminal y is the cell A. The load balancing device 110 may compare the preconfigured configuration combination with the first configuration combination, and may determine that the terminal x is the terminal to perform handover. The load balancing device 110 may transmit a control message to the first base station 120 of the cell A, which is the serving cell of the terminal x. The control message may include an identifier of the terminal to perform the handover and information indicating the handover.

Although not shown in FIG. 5, in some embodiments, the load balancing device 110 may determine the influence of the interference due to the existing serving cell after identifying the first configuration combination, instead of considering the interference in the load calculation process. Specifically, the load balancing device 110 may determine the influence of the interference, based on a signal-to-noise ratio (SNR) value, a carrier-to-interference plus noise ratio (CINR) value, a signal-to-interference plus noise ratio (SINR) value, or a signal-to-interference ratio (SIR) value, which is measured by the terminal performing handover. If the quality deterioration due to interference is significant, the load balancing device 110 may repeat the operations of step 510 and the subsequent steps in FIG. 5.

As described with reference to FIG. 5, the load balancing device 110 may calculate the loads of the respective configuration combinations, and may then select one configuration combination that satisfies predetermined criteria. Accordingly, load balancing may be performed in accordance with an optimal configuration combination.

Meanwhile, if the load for each cell is calculated in any order for all of the plurality of configuration combinations, the complexity may increase. In order to solve this complexity problem, the load balancing device 110 may control the order of the plurality of configuration combinations. In some embodiments, the load balancing device 110 may control so as to preferentially calculate a load for each cell according to configuration combinations for a specific configuration (for example, handover of a terminal expected to have a relatively high load balancing effect). The terminal expected to have a high load balancing effect may be a terminal located in a cell boundary area where the cell coverage overlaps other cell coverage, or may be a terminal belonging to the serving beam area in which no other terminals are located. The load balancing device 110 may sequentially calculate the load for each cell according to the configuration combinations. The load balancing device 110 may identify a specific configuration combination before calculating the load for each cell with respect to all of the plurality of configuration combinations by controlling the order. In some other embodiments, the load balancing device 110 may control the order of the plurality of configuration combinations in such a manner that the complexity of the calculation of the predicted load for each cell is minimized. For example, the load balancing device 110 may control the order of the plurality of configuration combinations such that the terminal performing handover increases or decreases by one.

In the embodiment described with reference to FIG. 5, the load balancing device 110 configures a plurality of configuration combinations. In this case, the load balancing device 110 may consider the number of possible cases. However, in order to reduce computational complexity, the load balancing device 110 may allow only some of the terminals to change the serving cell by load balancing. In other words, the load balancing device 110 may identify candidate terminals for constituting the plurality of configuration combinations. The candidate terminal refers to the terminal of which the serving cell may be changed for load balancing. That is, in configuring a plurality of configuration combinations, the change of the serving cell for a terminal other than the candidate terminal may not be considered. For example, the second terminal 142 in FIG. 1 is located adjacent to the first base station 120. If the second terminal 142 is handed over to another cell (e.g., the second cell), the second terminal 142 may experience significant degradation in quality, compared to the case where the serving cell is the first cell. The load balancing device 110 may be required to identify terminals of which the gap of quality deterioration is not greater than a predetermined value even if a load balancing operation, such as handover, is performed. An embodiment for reducing the number of configuration combinations by identifying candidate terminals will described with reference to FIG. 6.

Figure 6:
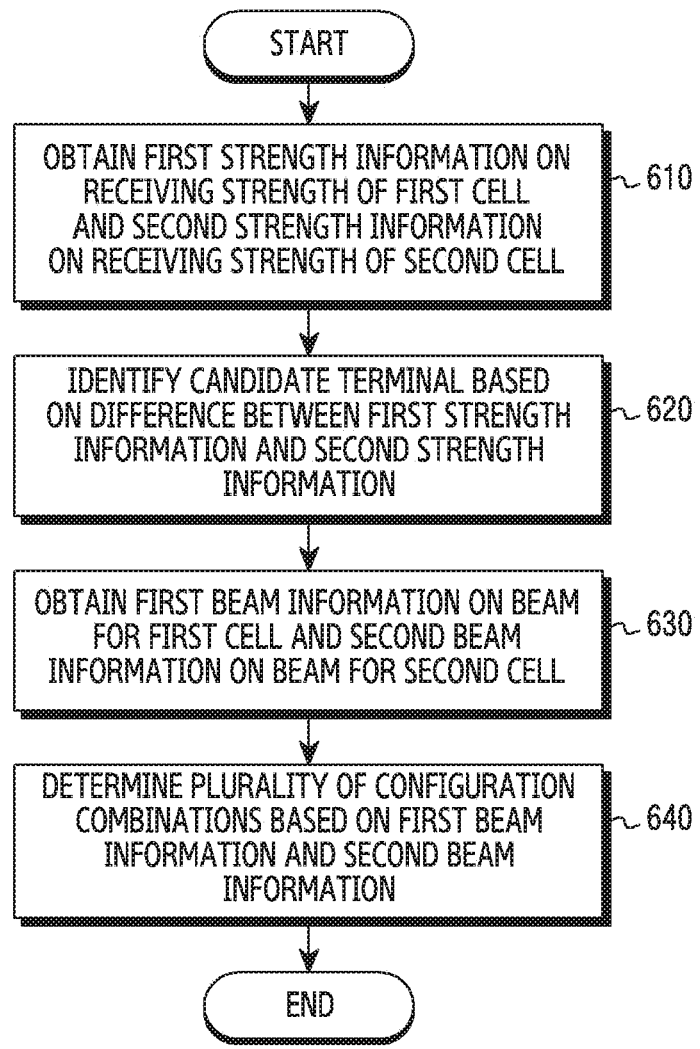
FIG. 6 is a flowchart illustrating an operation of determining configuration combinations by a load balancing device in a wireless communication system according to various embodiments of the disclosure.

FIG. 6 is a flowchart illustrating an operation of determining configuration combinations by a load balancing device 110 in a wireless communication system according to various embodiments of the disclosure. Hereinafter, a detailed operation of the load balancing device 110 in step 510 of FIG. 5 will be described with reference to FIG. 6.

Referring to FIG. 6, in step 610, the load balancing device 110 may obtain first strength information on the receiving strength of a first cell and second strength information on the receiving strength of a second cell. Referring to the second terminal 142 in FIG. 1 as an example, the load balancing device 110 may obtain first strength information from the first base station 120. The first cell may be the cell A in FIG. 1. The first strength information may be first state information indicating the receiving strength of the cell A, which is a serving cell of the second terminal 142. In addition, the load balancing device 110 may obtain second strength information from the first base station 120. The second cell may be the cell B in FIG. 1. The second strength information may be second state information indicating the receiving strength of the cell B, which is a neighboring cell of the second terminal 142.

In step 620, the load balancing device 110 may identify a candidate terminal, based on the difference between the first strength information and the second strength information. The load balancing device 110 may determine whether or not the difference between the first strength information and the second strength information is equal to or greater than a threshold value. If the difference between the receiving strength of a reference signal transmitted from the serving cell and the receiving strength of a reference signal transmitted from the neighboring cell is less than the threshold value, the load balancing device 110 may determine that the corresponding terminal is located in the cell-overlapping area. The load balancing device 110 may identify candidate terminals located in the cell-overlapping area from among all terminals served by the cells. This is due to the fact that the terminal is expected to exhibit significant quality degradation if the terminal that is not located in the cell-overlap area performs handover. For example, the load balancing device 110 may identify the third terminal 143 in FIG. 1.

In step 630, the load balancing device 110 may obtain first beam information about the beam for the first cell and second beam information about the beam for the second cell. Referring to the second terminal 142 in FIG. 1 as an example, the load balancing device 110 may obtain first beam information (e.g., the beam 123), as first state information of the cell A, which is the serving cell of the third terminal 143, from the first base station 120. In addition, the load balancing device 110 may obtain second beam information (e.g., 133), as second state information of the cell B, which is a neighboring cell of the third terminal 143, from the first base station 120.

In step 640, the load balancing device 110 may determine a plurality of configuration combinations, based on the first beam information and the second beam information. The load balancing device 110 may identify terminals corresponding to the case where the beam indicated by the first beam information is the same as the beam indicated by the second beam information. Hereinafter, the identified terminals may be referred to as "clustered terminals". The load balancing device 110 may identify the cluster terminals, among candidate terminals identified in step 620. The load balancing device 110 may determine the cluster terminals to be a group. The load balancing device 110 may determine a plurality of configuration combinations, based on the number of the determined groups. For example, the load balancing device 110 may identify three candidate terminals in step 620. Two of the three candidate terminals may be cluster terminals having the same optimal beam for the cell A and the cell B, respectively. The load balancing device 110 may determine the plurality of configuration combinations according to whether the serving cell of each of one group and another candidate terminal is the cell A or the cell B, instead of determining the plurality of configuration combinations according to the serving cell of each of the three candidate terminals is the cell A or the cell B. This is due to the fact that, if the serving cells of the cluster terminals are different from each other, inter-cell interference between the terminals may be caused. Thereafter, if the load balancing device 110 determines to hand over one terminal in the group, the load balancing device 110 may also determine to hand over other terminals in the group.

The description of FIG. 6 has been made in order of identifying candidate terminals through steps 610 and 620 (hereinafter, "boundary identification") and identifying cluster terminals through steps 630 and 640 (hereinafter, "grouping"), but the disclosure is not limited thereto. The boundary identification operation may be performed before the grouping operation, or may be performed at the same time as the grouping operation. In this case, in step 630, the load balancing device 110 may identify the cluster terminals from among all terminals served by cells, instead of identifying the cluster terminals from among the identified candidate terminals.

The load balancing device 110 may control the number of situations (corresponding to the number of configuration combinations) assumed to predict the effective load balancing effect through the operation in FIG. 6, thereby reducing the computational complexity of the load balancing device 110 and improving the experienced quality of load balancing.

Figure 7:
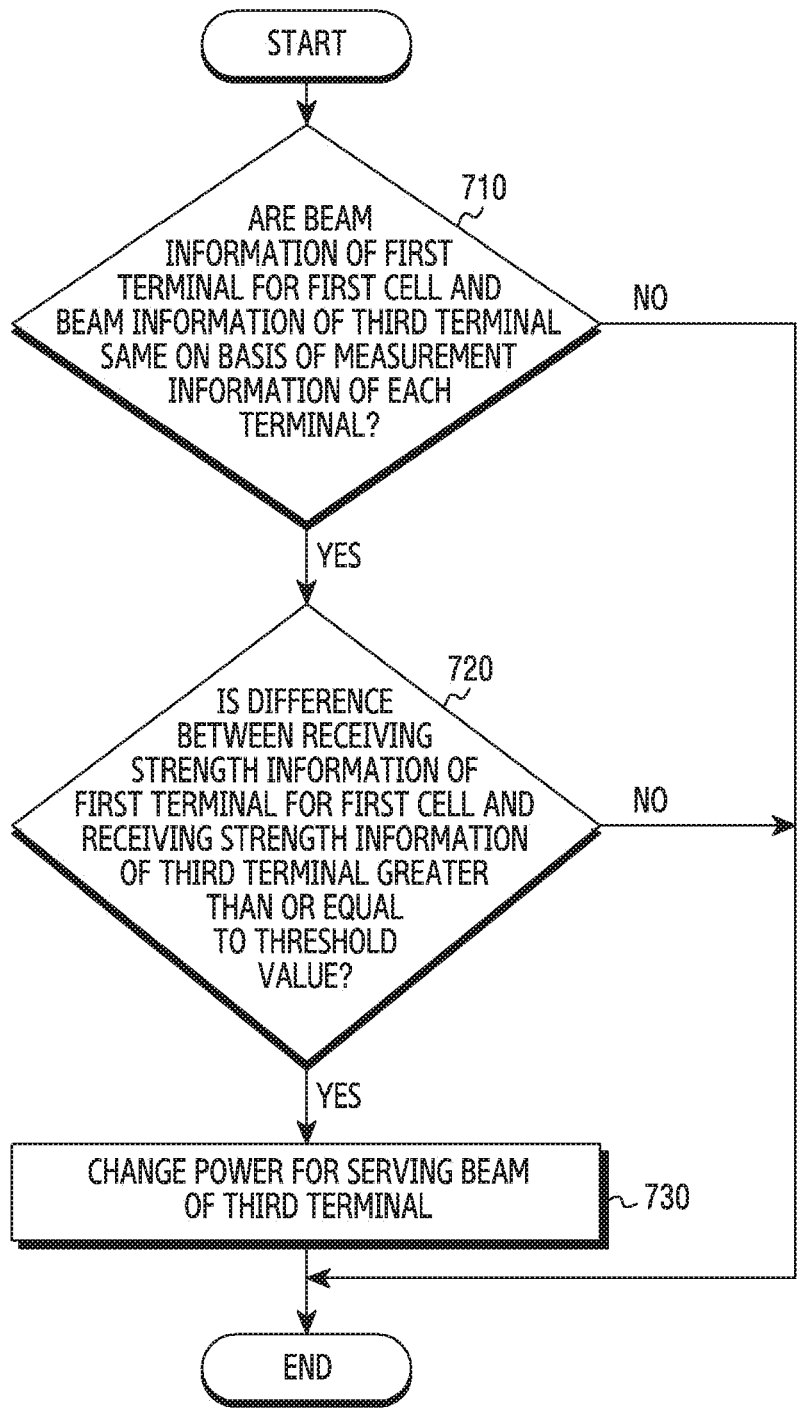
FIG. 7 is a flowchart illustrating a power control procedure of a load balancing device in a wireless communication system according to various embodiments of the disclosure.

FIG. 7 is a flowchart illustrating a power control procedure of a load balancing device 110 in a wireless communication system according to various embodiments of the disclosure. The power control procedure described with reference to FIG. 7 may be performed independently from the handover operation described with reference to FIGS. 4 to 6, may be performed depending on the handover of a specific terminal, or may be simultaneously performed in association with the handover operation.

Referring to FIG. 7, in step 710, the load balancing device 110 may determine whether or not beam information of a first terminal in a first cell is the same as beam information of a third terminal in the first cell, based on measurement information of the respective terminals. For example, the load balancing device 110 may consider the case where the serving cell of the first terminal and the third terminal is the first cell. The serving beam of the first terminal and the serving beam of the third terminal may be the same. As another example, the load balancing device 110 may consider the case where the serving cell of the first terminal is the first cell and the neighboring cell of the third terminal is the first cell. The serving beam of the first terminal and the optimal beam for the first cell of the third terminal may be the same.

If the beam information of the first terminal for the first cell and the beam information of the third terminal for the first cell are the same, the load balancing device 110 may perform an operation in step 720. On the other hand, if the beam information of the first terminal in the first cell and the beam information of the third terminal in the first cell are not the same, the load balancing device 110 may terminate the power control procedure.

If the difference between the receiving strength information of the first terminal for the first cell and the receiving strength information of the third terminal for the first cell is equal to or greater than a threshold value in operation 720, the load balancing device 110 may perform the operation in step 730. For example, the first terminal may measure a reference signal transmitted from the first cell (e.g., −72 dBm) to determine an RSRP value of 69, and may feed the determined value back to the first cell as a serving cell. The third terminal may measure a reference signal transmitted from the first cell (e.g., −49 dbm) to determine an RSRP value of 92, and may report the determined value to the first cell. If the difference between the RSRP values is equal to or greater than a threshold value of 20, the load balancing device 110 may determine to perform a power control procedure in step 730. This is due to the fact that, if the receiving strength differs by more than a predetermined value, the two terminals may be distinguished through power control. Meanwhile, if the difference between the receiving strength information of the first terminal for the first cell and the receiving strength information of the third terminal for the first cell is less than a threshold value, the load balancing device 110 may terminate the power control procedure. The threshold value may be adaptively adjusted according to at least one of capability information of the base station, distribution of the respective terminals served by the cells, and the amount of resource usage.

In step 730, the load balancing device 110 may change power of the serving beam of the third terminal. The load balancing device 110 may transmit a control message to the first base station 120, which is a serving base station of the third terminal, so as to control power. The control message may include an ID indicating the third terminal and information indicating a power value or a power range for a specific beam associated with the third terminal. Upon receiving the control message, the first base station 120 may increase or decrease the power of the serving beam of the third terminal. For example, if the third terminal is located closer to the first base station 120 than the first terminal, the control message may be intended to lower the transmission power of the data channel through the serving beam of the third terminal.

Although not shown in FIG. 7, the load balancing device 110 may perform control such that the first terminal is handed over from the first cell to the second cell. If necessary, the load balancing device 110 may control the second base station 130 of the second cell so as to increase the power of an optimal beam for the first terminal. By controlling power to extend the coverage of the other cell, the second cell may effectively handle the load of the first terminal.

It has been described that the determination of handover and the power control operation are performed separately in FIG. 7, but the determination of handover and the power control operation may be combined to be performed in a complementary manner. The load balancing device 110 may configure a plurality of configuration combinations in consideration of both the determination of handover and the power control operation, and may then determine an optimal configuration combination. For example, the load balancing device 110 may configure the plurality of configuration combinations in consideration of the electric field of the serving beam (or the provided power of a beam). A wireless communication environment 1000 and a wireless communication environment 1050, which will be described in FIG. 10, may be considered. In the wireless communication environment 1000, the serving cell of the first terminal 1041 may be the first cell, and the serving cell of the third terminal 1043 may be the second cell. The load balancing device 110 may configure the plurality of configuration combinations in consideration of the number of power-controllable levels of the first terminal 1041, the number of power-controllable levels of the third terminal 1043, and the number of cells managed by the load balancing device 110. The second terminal may experience interference due to the beam provided from the first cell to the first terminal 1041. However, since the first terminal 1041 is a strong-electric field terminal, even if the transmission power of the beam provided by the first cell is reduced, the first terminal 1041 may have less influence. That is, the load balancing device 110 may find an optimal configuration combination in consideration of the above-described matters from among the plurality of configuration combinations. As described above, even if the SNR of the first terminal decreases, the load balancing device 110 may improve the communication quality in consideration of all the cells (the first cell and the second cell).

Hereinafter, referring to FIGS. 8 to 10, the disclosure will describe detailed use cases of the operations of the load balancing device 110 described with reference to FIGS. 4 to 7.

Figure 8:
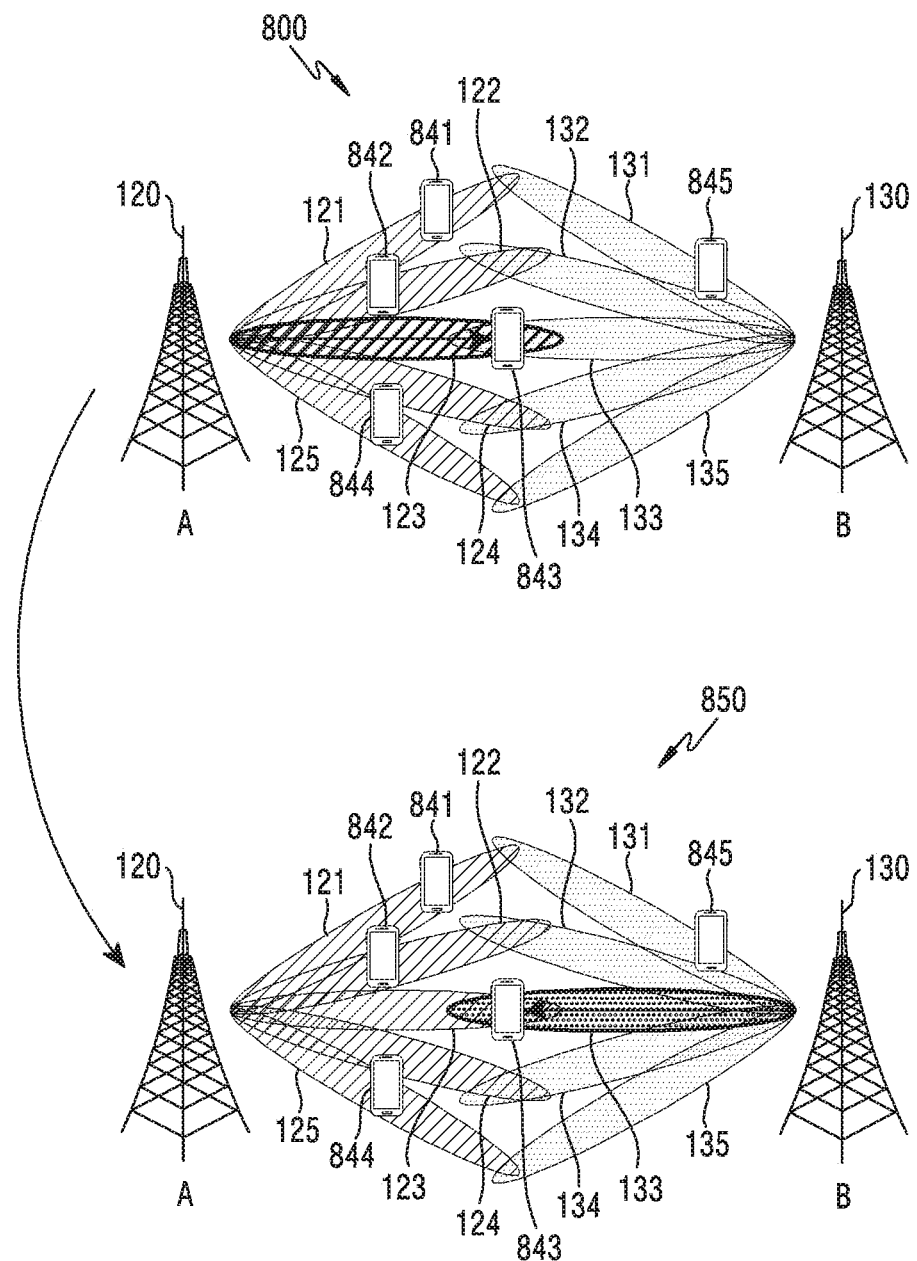
FIG. 8 illustrates an example of load balancing in a wireless communication system according to various embodiments of the disclosure.

FIG. 8 illustrates an example of load balancing in a wireless communication system according to various embodiments of the disclosure. The load balancing device 110 controls cells of base stations connected to the load balancing device 110, thereby performing load balancing. Hereinafter, for the convenience of description, the wireless communication environment 800 represents cells and terminals before performing load balancing, and the wireless communication environment 850 represents cells and terminals after performing load balancing of the load balancing device 110.

Referring to FIG. 8, the wireless communication environments 800 and 850 may include base stations, terminals, and a load balancing device 110. The respective base stations and terminals may perform beamforming. The base stations may include a first base station 120 and a second base station 130. The first base station 120 may be provided to the terminals within a cell range A. The second base station 130 may be provided to the terminals within a cell range B. The first base station 120 may communicate with at least one terminal in coverage using beams 121 to 125. The second base station 130 may communicate with at least one terminal in coverage using beams 131 to 135. The terminals may include a first terminal 841, a second terminal 842, a third terminal 843, a fourth terminal 844, and a fifth terminal 845.

The load balancing device 110 may obtain measurement information of respective ones of the first terminal 841, the second terminal 842, the third terminal 843, and the fourth terminal 844 from the first base station 120. For example, the load balancing device 110 may obtain, from the first base station 120, beam information indicating an optimal beam of the first base station 120 with respect to the third terminal 843 and information indicating the receiving strength of the corresponding beam. In addition, the load balancing device 110 may obtain, from the first base station 120, beam information indicating an optimal beam of the second base station 130 with respect to the third terminal 843 and information indicating the receiving strength of the corresponding beam. The load balancing device 110 may determine that the third terminal 843 is located at a cell boundary if the difference between the receiving strength of the third terminal 843 from the serving cell (the cell A) and the receiving strength thereof from the neighboring cell (the cell B) is less than a threshold value. The load balancing device 110 may identify the third terminal 843 as a candidate terminal, among the plurality of terminals.

The load balancing device 110 may determine a first configuration combination corresponding to the case where the serving cell of the third terminal 843 is the cell A and a second configuration combination corresponding to the case where the serving cell of the third terminal 843 is the cell B. In this case, it is noted that the current serving cells configured to the first terminal 841, the second terminal 842, the fourth terminal 844, and the fifth terminal 845 may be maintained.

The load balancing device 110 may predict a load for each cell in the case of the first combination. For example, if the load is defined as the number of terminals (the number of users) connected to a specific cell, the load balancing device 110 may determine the load of cell A to be "4" and the load of cell B to be "1". The load balancing device 110 may predict a load for each cell in the case of the second configuration combination. For example, if the load is defined as the number of terminals (the number of users) connected to a specific cell, the load balancing device 110 may determine the load of cell A to be "3" and the load of cell B to be "2". The load balancing device 110 may determine that the second configuration combination, among the first configuration combination and the second configuration combination, has the smallest standard deviation with respect to the loads of all cells. The load balancing device 110 may perform load balancing according to the determined second configuration combination.

The load balancing device 110 may produce a control message according to the determined second configuration combination. The control message may be a message configured for the third terminal 843 to perform handover. The load balancing device 110 may transmit the control message to the first base station 120 as a serving base station of the third terminal 843. The first base station 120 may transmit a handover command to the third terminal 843 according to the control message. The third terminal 843 may perform handover from the first base station 120 to the second base station 130 according to the handover command. As shown in the wireless communication environment 850, load balancing may be performed as the third terminal 843 performs handover.

In beamforming-based communication systems, the interference of an existing source cell may be relatively less due to the directivity between the beams. The load balancing device 110 may perform a load balancing operation more effectively than the conventional radio access technology (RAT).

In particular, in the case where only the third terminal 843 is located in the area of the beam 123, if the third terminal 843 is handed over to the cell B, the first base station 120 does not use the beam 12, thereby minimizing the inter-cell interference. In some embodiments, the load balancing device 110 may further determine whether or not beam information of another terminal indicating the beam 123 is obtained after transmitting the control message for handover of the third terminal 843. This is due to the fact that the handover of the third terminal 843 may cause interference with the terminal located in the area of the beam 123.

Although not shown in FIG. 8, if there is another terminal located in the area of the beam 123, the load balancing device 110 may control so as to handover the another terminal to the cell B, or may control transmission power of the beam 123.

Figure 9:
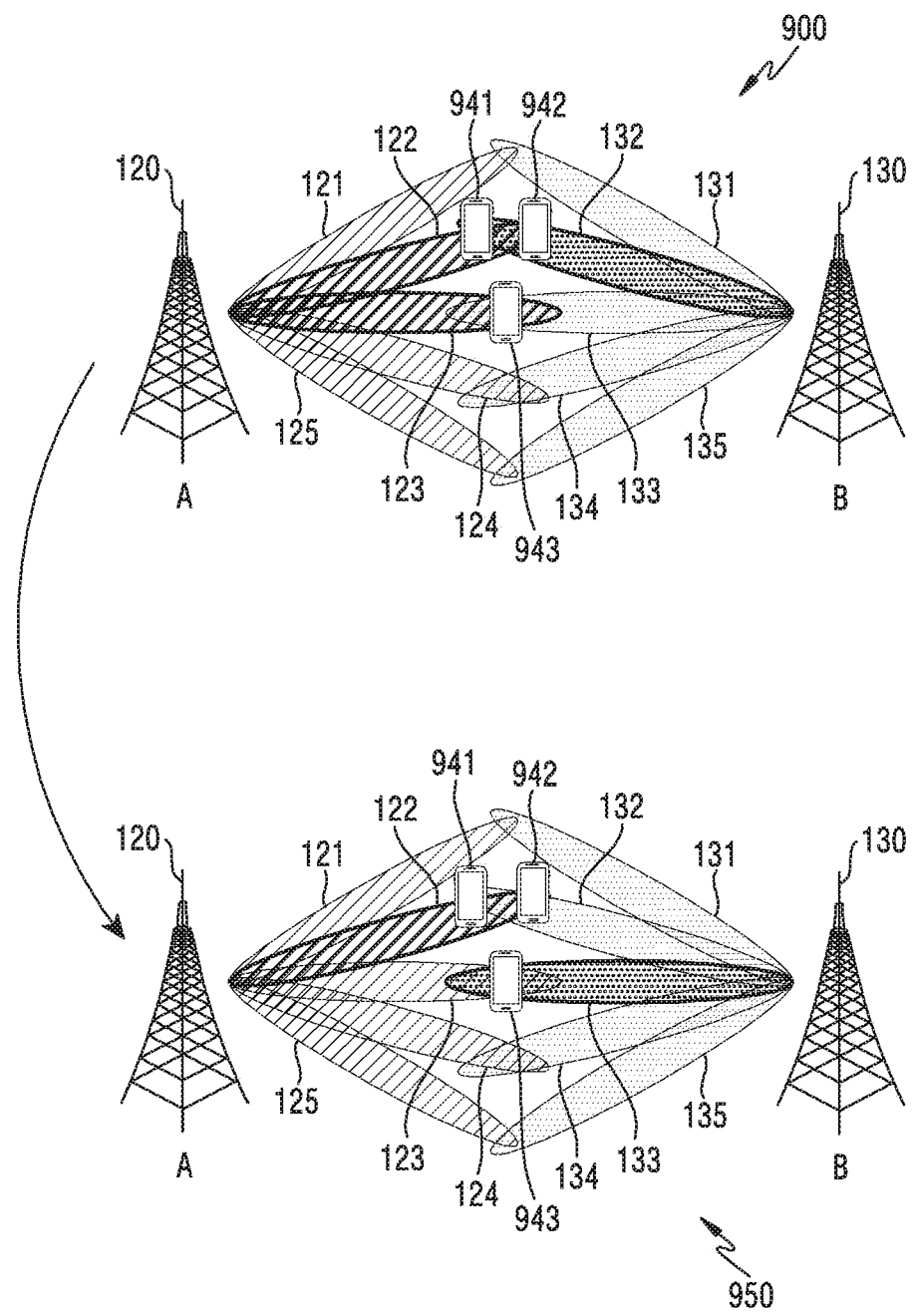
FIG. 9 illustrates another example of load balancing in a wireless communication system according to various embodiments of the disclosure.

FIG. 9 illustrates another example of load balancing in a wireless communication system according to various embodiments of the disclosure. The load balancing device 110 controls cells of base stations connected to the load balancing device 110, thereby performing load balancing. Hereinafter, for the convenience of description, the wireless communication environment 900 represents cells and terminals before performing load balancing, and the wireless communication environment 950 represents cells and terminals after performing load balancing of the load balancing device 110.

Referring to FIG. 9, the wireless communication environments 900 and 950 may include base stations, terminals, and a load balancing device 110. The respective base stations and terminals may perform beamforming. The base stations may include a first base station 120 and a second base station 130. The first base station 120 may be provided to the terminals within a cell range A. The second base station 130 may be provided to the terminals within a cell range B. The first base station 120 may communicate with at least one terminal in coverage using beams 121 to 125. The second base station 130 may communicate with at least one terminal in coverage using beams 131 to 135. The terminals may include a first terminal 941, a second terminal 942, and a third terminal 943.

The load balancing device 110 may obtain measurement information of respective ones of the first terminal 941 and the third terminal 943 from the first base station 120. For example, the load balancing device 110 may obtain, from the first base station 120, beam information indicating an optimal beam (e.g., the beam 122) of the first base station 120 with respect to the first terminal 941 and information indicating the receiving strength of the corresponding beam. In addition, the load balancing device 110 may obtain, from the first base station 120, beam information indicating an optimal beam (e.g., the beam 132) of the second base station 130 with respect to the first terminal 941 and information indicating the receiving strength of the corresponding beam. The load balancing device 110 may determine that the first terminal 941 is located at a cell boundary if the difference between the receiving strength of the first terminal 941 from the serving cell (the cell A) and the receiving strength thereof from the neighboring cell (the cell B) is less than a threshold value. The load balancing device 110 may identify the first terminal 941 as a candidate terminal, among a plurality of terminals. The load balancing device 110 may identify the second terminal 942 and the third terminal 943 as candidate terminals in the same manner as described above.

The load balancing device 110 may determine a total of eight configuration combinations according to whether the serving cell of each of the three terminals 941 to 943 is the cell A or the cell B. In this case, although not shown in FIG. 9, the terminals that are not currently located in the cell boundary may maintain currently configured serving cells.

The load balancing device 110 may predict a load for each cell with respect to each of the eight configuration combinations. For example, the load balancing device 110 may define a load as an average number of resources (e.g., the number of PRBs) processed in a specific cell per cycle. It is assumed that that the number of resources allocated to the first terminal 941 per cycle is 2 PRBs, the number of resources allocated to the second terminal 942 is 1 PRB, and the number of resources allocated to the third terminal 943 is 3 PRBs. If the serving cell of the first terminal 941 and the third terminal 943 is the cell A, and if the serving cell of the second terminal 942 is the cell B, the load balancing device 110 may determine the load of the cell A to be "5" and the load of the cell B to be "1". The load balancing device 110 may sequentially produce predicted loads of the respective ones of the eight configuration combinations in the same manner as the above example.

In some embodiments, the load balancing device 110 may identify some configuration combinations of the eight configuration combinations in consideration of beam information of the respective terminals. For example, the load balancing device 110 may identify the beam 122 from the first state information transmitted from the first terminal 941 to the first base station 120, and may identify the beam 132 from the measurement information. The beams 122 and 132 may be optimal beams of the serving cell (the cell A) and the neighboring cell (the cell B) for the first terminal 941, respectively. The load balancing device 110 may identify the beam 132 from the first state information transmitted from the second terminal 942 to the second base station 130, and may identify the beam 122 from the measurement information. The beams 132 and 122 may be optimal beams of the serving cell (the cell B) and the neighboring cell (the cell A) for the second terminal 942, respectively. The load balancing device 110 may recognize that the first terminal 941 and the second terminal 942 are located in one area. The area may be defined as a range causing interference above a threshold. The load balancing device 110 may determine the first terminal 941 and the second terminal 942 to be one group. The load balancing device 110 may exclude a configuration combination in which the first terminal 941 and the second terminal 942 have different serving cells from each other from the eight configuration combinations according to eight cases. The load balancing device 110 may identify four configuration combinations. For example, the load balancing device 110 may identify four configuration combinations such as (A, A, A), (A, A, B), (B, B, A), and (B, B, B) in order of the first terminal 941, the second terminal 943, and the third terminal 943. The load balancing device 110 may reduce the influence of interference by managing the terminals in the same beam area as one group.

The load balancing device 110 may determine whether or not to perform load balancing according to the produced load for each cell. The load balancing device 110 may identify one configuration combination, among the plurality of configuration combinations, according to specific criteria. The load balancing device 110 may determine whether or not to perform load balancing depending on whether or not the identified configuration combination is the same as the current configuration. For example, if the configuration combination as shown in the wireless communication environment 950 is identified, the load balancing device 110 may determine two terminals (e.g., the second terminal 942 and the third terminal 943) to perform handover. The load balancing device 110 may transmit a first control message to the second base station 130 serving as a serving base station of the second terminal 942. The first control message may include an identifier indicating the second terminal 942, a handover command of the second terminal 942, and information about a target base station (or a target cell (e.g., the cell A)) of the second terminal 942. The load balancing device 110 may transmit a second control message to the first base station 120 serving as a serving base station of the third terminal 943. The second control message may include an identifier indicating the third terminal 943, a handover command of the third terminal 943, and information about a target base station (or a target cell (e.g., the cell B)) of the third terminal 943.

The load balancing device 110 may predict the loads in consideration of the beam information of the respective terminals, thereby reducing the complexity of load balancing and minimizing the influence of interference (e.g., inter-cell interference). As a result, the load balancing device 110 may provide an optimal communication quality to the user of the terminal to be served.

Figure 10:
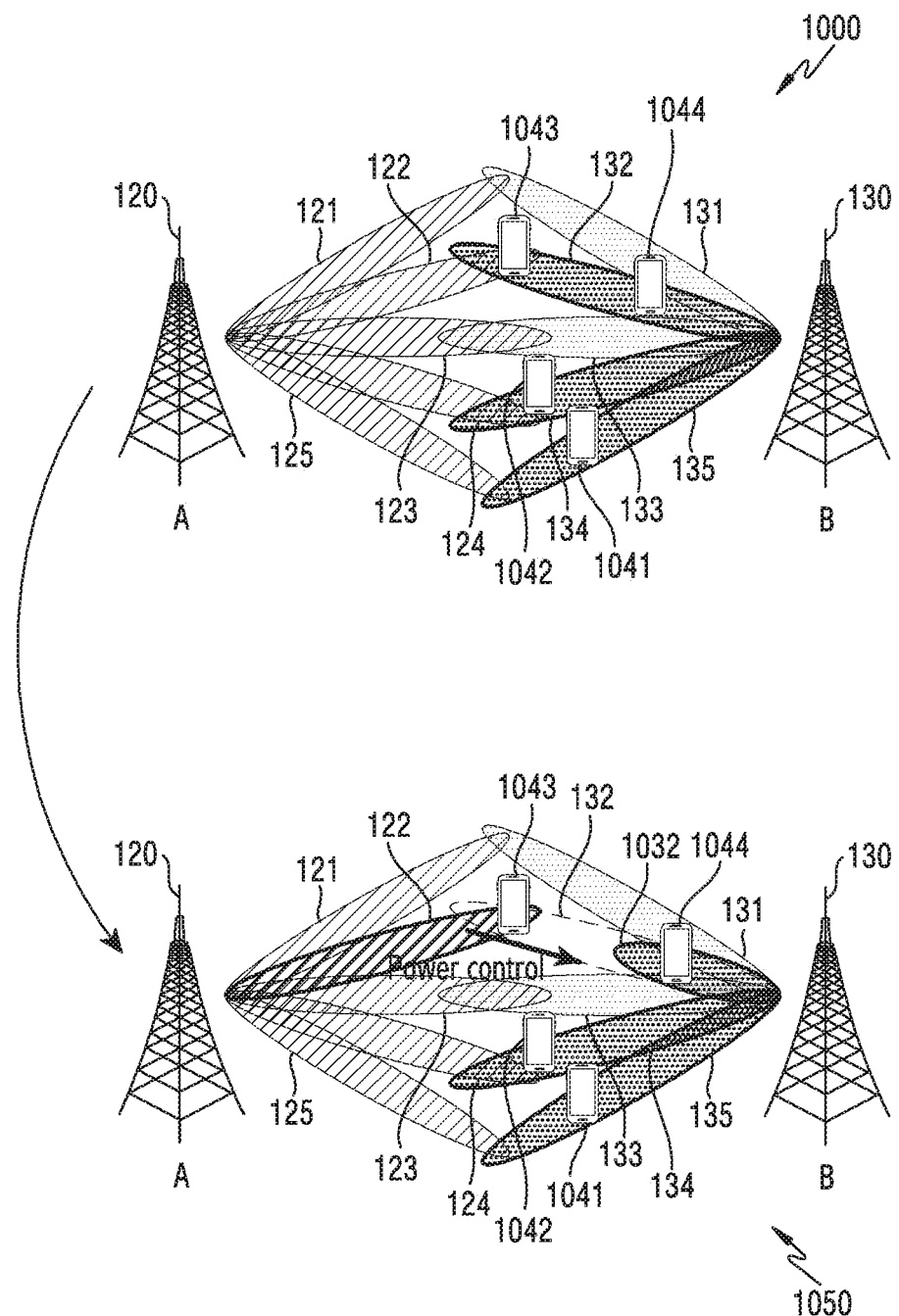
FIG. 10 illustrates another example of load balancing in a wireless communication system according to various embodiments of the disclosure.

FIG. 10 illustrates another example of load balancing in a wireless communication system according to various embodiments of the disclosure. The load balancing device 110 controls cells of base stations connected to the load balancing device 110, thereby performing load balancing. Hereinafter, for the convenience of description, the wireless communication environment 1000 represents cells and terminals before performing load balancing, and the wireless communication environment 1050 represents cells and terminals after performing load balancing of the load balancing device 110. In particular, FIG. 10 illustrates details of the power control operation described in connection with FIG. 7.

Referring to FIG. 10, the wireless communication environments 1000 and 1050 may include base stations, terminals, and a load balancing device 110. The respective base stations and terminals may perform beamforming. The base stations may include a first base station 120 and a second base station 130. The first base station 120 may be provided to the terminals within a cell range A. The second base station 130 may be provided to the terminals within a cell range B. The first base station 120 may communicate with at least one terminal in coverage using beams 121 to 125. The second base station 130 may communicate with at least one terminal in coverage using beams 131 to 135. The terminals may include a first terminal 1041, a second terminal 1042, a third terminal 1043, and a fourth terminal 1044.

The load balancing device 110 may obtain measurement information of respective ones of the first terminal 1041, the second terminal 1042, the third terminal 1043, and the fourth terminal 1044 from the second base station 130. For example, the load balancing device 110 may obtain, from the second base station 130, beam information indicating an optimal beam (e.g., the beam 132) of the second base station 130 with respect to the third terminal 1043 and information indicating the receiving strength of the corresponding beam. In addition, the load balancing device 110 may obtain, from the second base station 130, beam information indicating an optimal beam (e.g., the beam 122) of the first base station 120 with respect to the third terminal 1043 and information indicating the receiving strength of the corresponding beam. The load balancing device 110 may obtain, from the second base station 130, beam information indicating an optimal beam (e.g., the beam 132) of the second base station 130 with respect to the forth terminal 1044 and information indicating the receiving strength of the corresponding beam. In addition, the load balancing device 110 may obtain, from the second base station 130, beam information indicating an optimal beam (e.g., the beam 123) of the first base station 120 with respect to the forth terminal 1044 and information indicating the receiving strength of the corresponding beam.

The load balancing device 110 may identify that the third terminal 1043 and the fourth terminal 1044 have the same serving beam 132. The load balancing device 110 may compare the receiving strength of the third terminal 1043 and the receiving strength of the fourth terminal 1044 with respect to the reference signal transmitted through the beam 132. If the difference in the receiving strength is equal to or greater than a threshold value, the load balancing device 110 may identify that the third terminal 1043 and the fourth terminal 1044 are not located adjacent to each other even though they are located in the same direction from the second base station 130. Additionally, the load balancing device 110 may identify that the third terminal 1043 and the fourth terminal 1044 are not located adjacent to each other from the beam information (e.g., the beam 122) on the cell A of the third terminal 1043 and the beam information (e.g., the beam 132) on the cell A of the fourth terminal 1044.

The load balancing device 110 may determine a total of 16 ($=2^4$) configuration combinations according to whether the serving cell of each of the four terminals 1041 to 1044 is the cell A or the cell B. In this case, although not shown in FIG. 10, the terminals that are not currently located in the cell boundary may maintain currently configured serving cells. The load balancing device 110 may predict the load for each cell with respect to the 16 configuration combinations.

Meanwhile, the load balancing device 110 may sort the configuration combinations in the order of sequentially handing over the terminals far away from the relatively high load cell B before predicting the load for each cell for all of the 16 configuration combinations. The load balancing device 110 may identify the distance between each of the terminals provided with services from the cell B and the second base station 130 through the first state information received from the cell B.

The load balancing device 110 may perform control such that the third terminal 1043 to perform handover. The load balancing device 110 may transmit, to the second base station 130, a control message instructing the third terminal 1043 to perform handover to the first base station 120. The load balancing device 110 may allow the third terminal 1043 to receive a service through the cell A. The third terminal 1043 may receive data through the beam 122 of the first base station 120. In this case, the beam 132 of the second base station 130 may interfere with the beam 122. To this end, as shown in the wireless communication environment 1050, the second base station 130 produces a beam 1032 under the control of the load balancing device 110. The second base station 130 may transmit data to the fourth terminal 1044 through the beam 1032 with reduced transmission power. The load balancing device 110 may reduce the transmission power of the beam 132 of the second base station 130, thereby lowering the interference between the third terminal 1043 and the fourth terminal 1044.

As described above with reference to FIGS. 1 to 10, the load balancing device 110 may receive, from respective ones of a plurality of base stations (or cells), first state information and second state information (e.g., MR) of terminals to be served. The load balancing device 110 may perform handover and power control in consideration of beam information, as well as information on the receiving strength, thereby performing effective load balancing in a beamforming-communication-based system.

In the disclosure, although the expression "equal to or greater than", "more than", "equal to or less than", or "less than" has been used in order to determine whether or not a specific condition is fulfilled, this is only an example and does not exclude other expressions. The expression "equal to or greater than" can be replaced with "more than", the expression "equal to or less than" can be replaced with "less than", and the expression "equal to or greater than and less than" can be replaced with "greater than and equal to or less than" in the conditions above.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method of operating a device for load balancing in a wireless communication system, the method comprising:
    obtaining measurement information of a plurality of terminals served by a first cell or a second cell, wherein the measurement information includes first measurement information of a first terminal served by the first cell and second measurement information of a second terminal served by the first cell; and
    transmitting a control signal for switching a serving cell of the first terminal from the first cell to the second cell and for controlling power of the second terminal based on the first measurement information and the second measurement information,
    wherein the first measurement information includes:
        information indicating a first beam of the first cell and a first receiving strength of a reference signal transmitted through the first beam of the first cell, and
        information indicating a first beam of the second cell and a first receiving strength of a reference signal transmitted through the first beam of the second cell, and
    wherein the second measurement information includes:
        information indicating a second beam of the first cell and a second receiving strength of a reference signal transmitted through the second beam of the first cell, and
        information indicating a second beam of the second cell and a second receiving strength of a reference signal transmitted through the second beam of the second cell.

2. The method of claim 1,
    wherein the transmitting of the control signal comprises:

based on the obtained measurement information of each of the plurality of terminals served by the first cell or the second cell and load information obtained from the first cell and the second cell, determining a plurality of configuration combinations, wherein a configuration combination is a combination of serving cells selected for each of the plurality of terminals;

calculating an expected load for each of the plurality of the determined configuration combinations, and based on the expected load, identifying a first configuration combination among the plurality of configuration combinations.

3. The method of claim 2, wherein the first configuration combination among the plurality of configuration combinations satisfies a first condition, and wherein the first condition comprises at least of minimizing an average of loads of the first cell and the second cell, minimizing a load of a cell among the first cell and the second cell having a largest load, or minimizing standard deviation of loads of the first cell and the second cell.

4. The method of claim 3, wherein the load information is measured by the first cell and the second cell according to at least one of a number of resources used in each of the first cell and the second cell, a number of terminals connected to each of the first cell and the second cell, a ratio of resources required for throughput in a guaranteed bit rate (GBR) in each of the first cell and the second cell, a modulation and coding scheme (MCS) in each of the terminals connected to each of the first cell and the second cell, or transmission power for each beam in each of the first cell and the second cell.

5. The method of claim 1, wherein the controlling power of the second terminal is, based on the measurement information of each of the plurality of terminals, lowering a transmission power of the second beam of the first cell for the second terminal served by the first cell, among the plurality of terminals.

6. The method of claim 5, wherein the lowering of the transmission power of the second beam of the first cell for the second terminal comprises:

if the first beam of the first cell for the first terminal is same as the second beam of the first cell for the second terminal and if a difference between a signal quality for the first beam of the first cell for the first terminal and a signal quality for the second beam of the first cell for the second terminal is greater than a threshold, lowering the transmission power of the second beam of the first cell for the second terminal.

7. The method of claim 1, wherein the transmitting of the control signal comprises:

if the number of terminals connected to the first cell is equal to or greater than a first threshold value, if the number of terminals connected to the second cell is less than a second threshold value, and if the highest channel quality, among channel qualities for the second cell of the first terminal, is equal to or greater than a quality threshold value, producing the control signal.

8. The method of claim 1, wherein the transmitting of the control signal comprises:

if the number of terminals connected to the first cell using a serving beam of the first terminal, among the beams of the first cell, is equal to or greater than a threshold value, identifying the first terminal having the lowest channel quality, among the connected terminals; and producing the control signal for switching the serving cell of the identified first terminal from the first cell to the second cell.

9. The method of claim 1, wherein the device for load balancing is included in a base station providing the first cell.

10. The method of claim 1, wherein the first beam of the first cell is a beam having the highest channel quality among beams received by the first terminal from the first cell, wherein the first beam of the second cell is a beam having the highest channel quality among beams received by the first terminal from the second cell, wherein the second beam of the first cell is a beam having the highest channel quality among beams received by the second terminal from the first cell, and wherein the second beam of the second cell is a beam having the highest channel quality among beams received by the second terminal from the second cell.

11. A device for load balancing in a wireless communication system, the device comprising:

at least one transceiver; and at least one processor operably connected to the at least one transceiver, wherein the at least one processor is configured to:

obtain measurement information of a plurality of terminals served by a first cell or a second cell, wherein the measurement information includes first measurement information of a first terminal served by the first cell and second measurement information of a second terminal served by the first cell, and transmit a control signal for switching a serving cell of the first terminal from the first cell to the second cell and for controlling power of the second terminal based on the first measurement information and the second measurement information, wherein the first measurement information includes:

information indicating a first beam of the first cell and a first receiving strength of a reference signal transmitted through the first beam of the first cell, and information indicating a first beam of the second cell and a first receiving strength of a reference signal transmitted through the first beam of the second cell, and wherein the second measurement information includes:

information indicating a second beam of the first cell and a second receiving strength of a reference signal transmitted through the second beam of the first cell, and information indicating a second beam of the second cell and a second receiving strength of a reference signal transmitted through the second beam of the second cell.

12. The device of claim 11, wherein the at least one processor is further configured to:

based on the obtained measurement information of each of the plurality of terminals served by the first cell or the second cell and load information obtained from the first cell and the second cell, determine a plurality of configuration combinations, wherein a configuration combination is a combination of serving cells selected for each of the plurality of terminals, calculate an expected load for each of the plurality of the determined configuration combinations, and based on the expected load, identify a first configuration combination among the plurality of configuration combinations.

13. The device of claim 12,
wherein the first configuration combination satisfies among the plurality of configuration combinations a first condition, and
wherein the first condition comprises at least of minimizing an average of loads of the first cell and the second cell, minimizing a load of a cell among the first cell and the second cell having a largest load, or minimizing standard deviation of loads of the first cell and the second cell.

14. The device of claim 13, wherein the load information is measured by the first cell and the second cell according to at least one of a number of resources used in each of the first cell and the second cell, a number of terminals connected to each of the first cell and the second cell, a ratio of resources required for throughput in a guaranteed bit rate (GBR) in each of the first cell and the second cell, a modulation and coding scheme (MCS) in each of the terminals connected to each of the first cell and the second cell, or transmission power for each beam in each of the first cell and the second cell.

15. The device of claim 11,
wherein the first beam of the first cell is a beam having the highest channel quality among beams received by the first terminal from the first cell,
wherein the first beam of the second cell is a beam having the highest channel quality among beams received by the first terminal from the second cell,
wherein the second beam of the first cell is a beam having the highest channel quality among beams received by the second terminal from the first cell, and
wherein the second beam of the second cell is a beam having the highest channel quality among beams received by the second terminal from the second cell.

16. The device of claim 11, wherein the at least one processor is further configured to:
lower a transmission power of the second beam of the first cell for the second terminal served by the first cell, among the plurality of terminals, based on the measurement information of each of the plurality of terminals.

17. The device of claim 16, wherein the at least one processor is further configured to:
if the first beam of the first cell for the first terminal is same as the second beam of the first cell for the second terminal and if a difference between a signal quality for the first beam of the first cell for the first terminal and a signal quality for the second beam of the first cell for the second terminal is greater than a threshold, lower the transmission power of the second beam of the first cell for the second terminal.

18. The device of claim 11, wherein the at least one processor is further configured to:
if the number of terminals connected to the first cell is equal to or greater than a first threshold value, if the number of terminals connected to the second cell is less than a second threshold value, and if the highest channel quality, among channel qualities for the second cell of the first terminal, is equal to or greater than a quality threshold value, produce the control signal.

19. The device of claim 11, wherein the at least one processor is further configured to:
if the number of terminals connected to the first cell using a serving beam of the first terminal, among the beams of the first cell, is equal to or greater than a threshold value, identifying the first terminal having the lowest channel quality, among the connected terminals; and
produce the control signal for switching the serving cell of the identified first terminal from the first cell to the second cell.

20. The device of claim 11, wherein the device for load balancing is included in a base station providing the first cell.

* * * * *